United States Patent
Cho et al.

(10) Patent No.: US 12,085,306 B2
(45) Date of Patent: Sep. 10, 2024

(54) GEOTHERMAL SYSTEM USING SINGLE WATER SUPPLY SYSTEM FOR HEATING AND COOLING SMART FARM AND BUILDING, AND METHOD FOR CONSTRUCTING GEOTHERMAL SYSTEM

(71) Applicant: G&G TECHNOLOGY CO., LTD., Incheon (KR)

(72) Inventors: Heuy Nam Cho, Incheon (KR); Hyeon Ho Chang, Ansan-si (KR); Sung Ouk Choi, Incheon (KR); Sang Gin Park, Incheon (KR)

(73) Assignee: G&G TECHNOLOGY CO., LTD., Incheon (KR)

( * ) Notice: Subject to any disclaimer, the term of this patent is extended or adjusted under 35 U.S.C. 154(b) by 512 days.

(21) Appl. No.: 17/298,670

(22) PCT Filed: Nov. 28, 2019

(86) PCT No.: PCT/KR2019/016527
§ 371 (c)(1),
(2) Date: Jun. 1, 2021

(87) PCT Pub. No.: WO2020/116854
PCT Pub. Date: Jun. 11, 2020

(65) Prior Publication Data
US 2022/0018555 A1    Jan. 20, 2022

(30) Foreign Application Priority Data
Dec. 7, 2018 (KR) ........................ 10-2018-0157452

(51) Int. Cl.
*F24F 5/00* (2006.01)
*F24T 10/20* (2018.01)
*F24T 10/00* (2018.01)

(52) U.S. Cl.
CPC ............ *F24F 5/0046* (2013.01); *F24T 10/20* (2018.05); *F24F 2005/0053* (2013.01); *F24T 2010/53* (2018.05); *F24T 2010/56* (2018.05)

(58) Field of Classification Search
CPC ... F24F 5/046; F24F 2005/0053; F24T 10/20; F24T 2010/50; F24T 2010/53;
(Continued)

(56) References Cited

U.S. PATENT DOCUMENTS

| 5,244,037 A * | 9/1993 | Warnke ................. F24T 10/10 237/66 |
| 8,047,275 B2 * | 11/2011 | Shim ..................... F24T 10/20 165/47 |
| 2010/0307734 A1 * | 12/2010 | Wildig ............... F28D 20/0052 165/45 |

FOREIGN PATENT DOCUMENTS

| JP | 11-210466 A | 8/1999 |
| JP | 2006-162207 A | 6/2006 |

(Continued)

OTHER PUBLICATIONS

Extended European Search Report of European Patent Application No. 19892399.7 mailed Aug. 5, 2022.
(Continued)

*Primary Examiner* — Marc E Norman
(74) *Attorney, Agent, or Firm* — Revolution IP, PLLC

(57) ABSTRACT

A geothermal system includes: at least two geothermal holes (1) formed in the ground; a return water circulation tube (10) for returning underground water of the geothermal holes; a water collection and supply well (20) for collecting and then supplying the underground water returned by the return water circulation tube; at least one heat pump (30) for generating heat for cooling and heating, by using, as a heat source, the heat of the underground water supplied by the water collection and supply well; and a supply tube (40)
(Continued)

which is an underground water supply means for supplying, to the geothermal holes, the underground water that supplied heat to the heat pump.

14 Claims, 26 Drawing Sheets

(58) Field of Classification Search
CPC ...... F24T 2010/56; Y02B 10/40; F25B 5/046; F25B 2005/0053
See application file for complete search history.

(56) References Cited

FOREIGN PATENT DOCUMENTS

| | | |
|---|---|---|
| JP | 2016-538526 A | 12/2016 |
| KR | 10-0880675 B1 | 1/2009 |
| KR | 10-1187863 B1 | 10/2012 |
| KR | 10-1220531 B1 | 1/2013 |
| KR | 10-2013-0131645 A | 12/2013 |
| KR | 10-2015-0057618 A | 5/2015 |
| KR | 10-2015-0126188 A | 11/2015 |
| KR | 10-2017-0137677 A | 12/2017 |

OTHER PUBLICATIONS

International Search Report for PCT/KR2019/016527 mailed Mar. 5, 2020 from Korean Intellectual Property Office.

* cited by examiner

【FIG. 1】
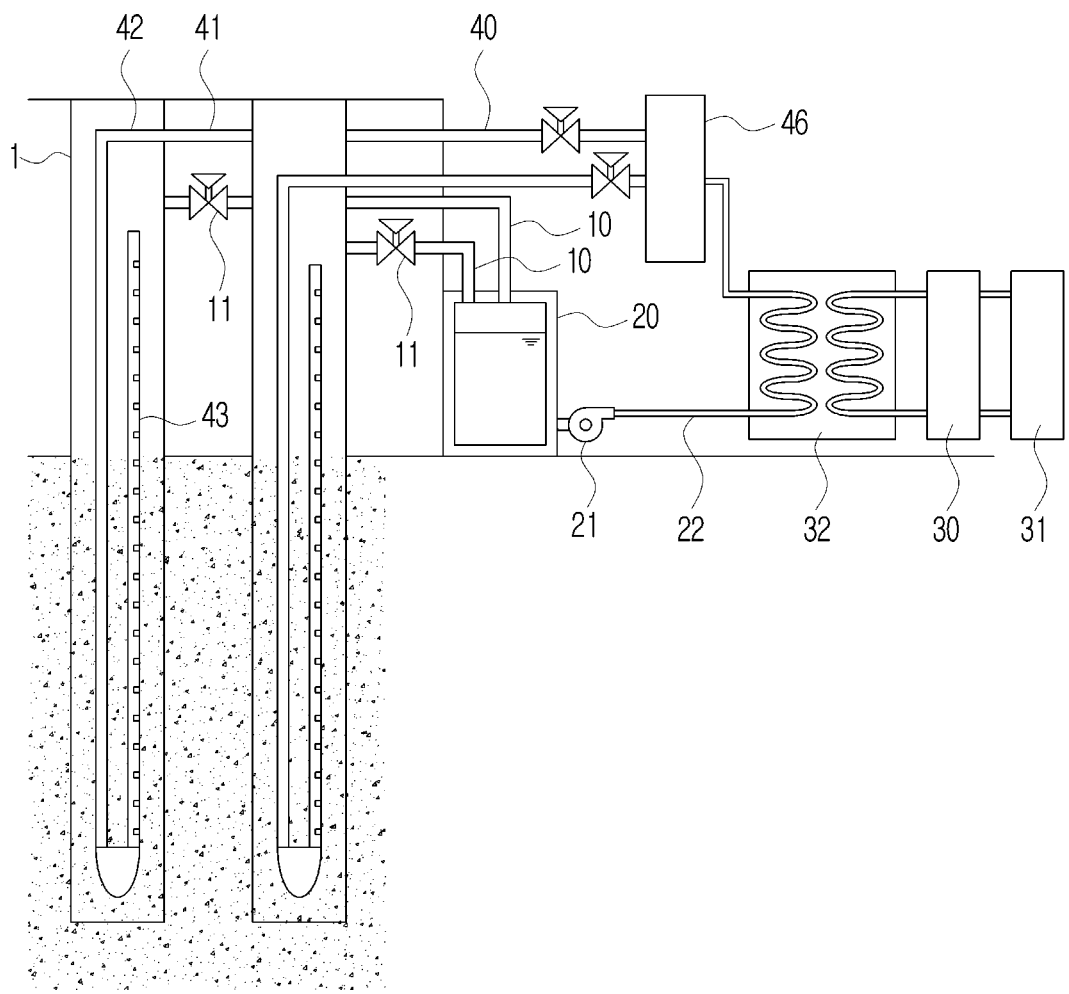

【FIG. 2A】
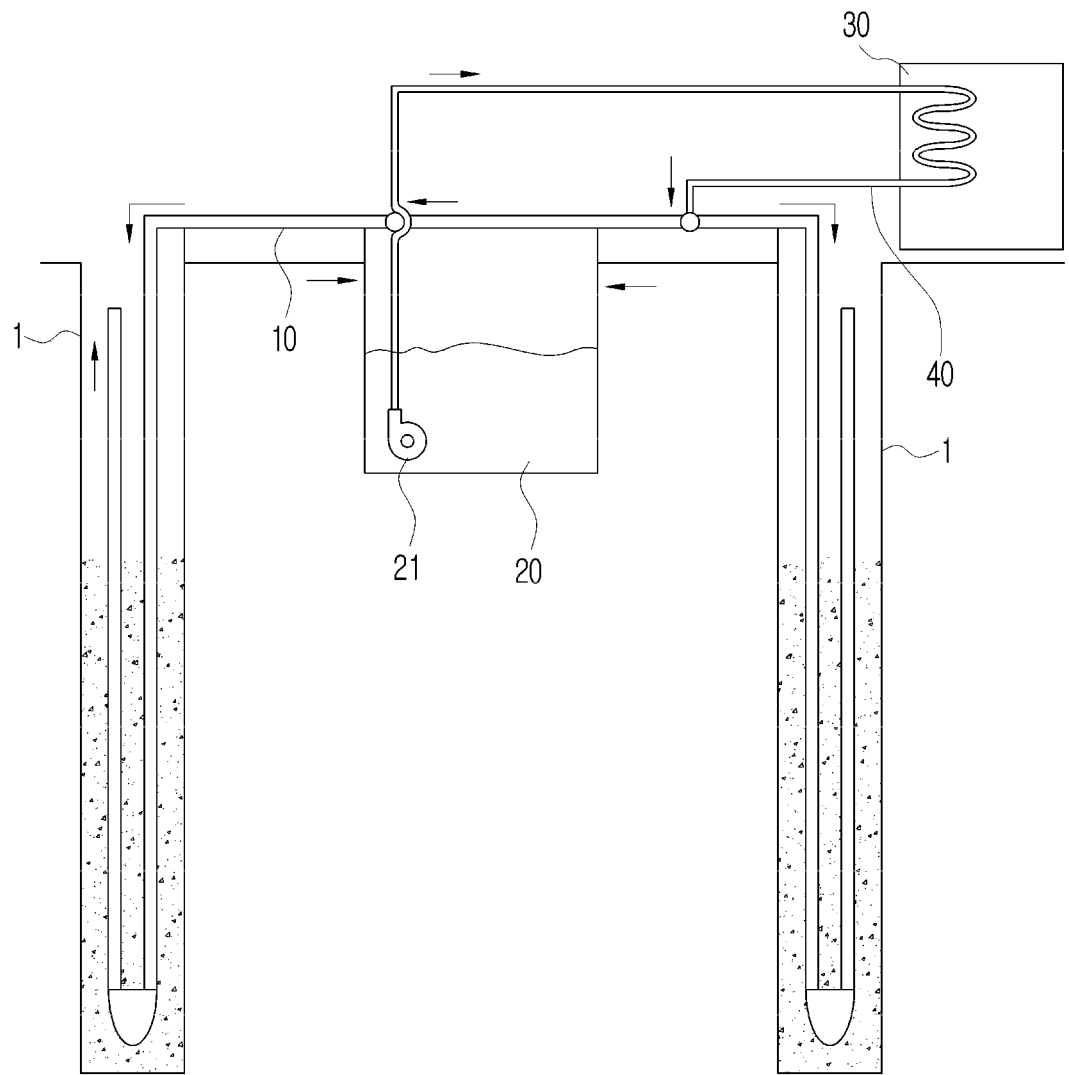

【FIG. 2B】
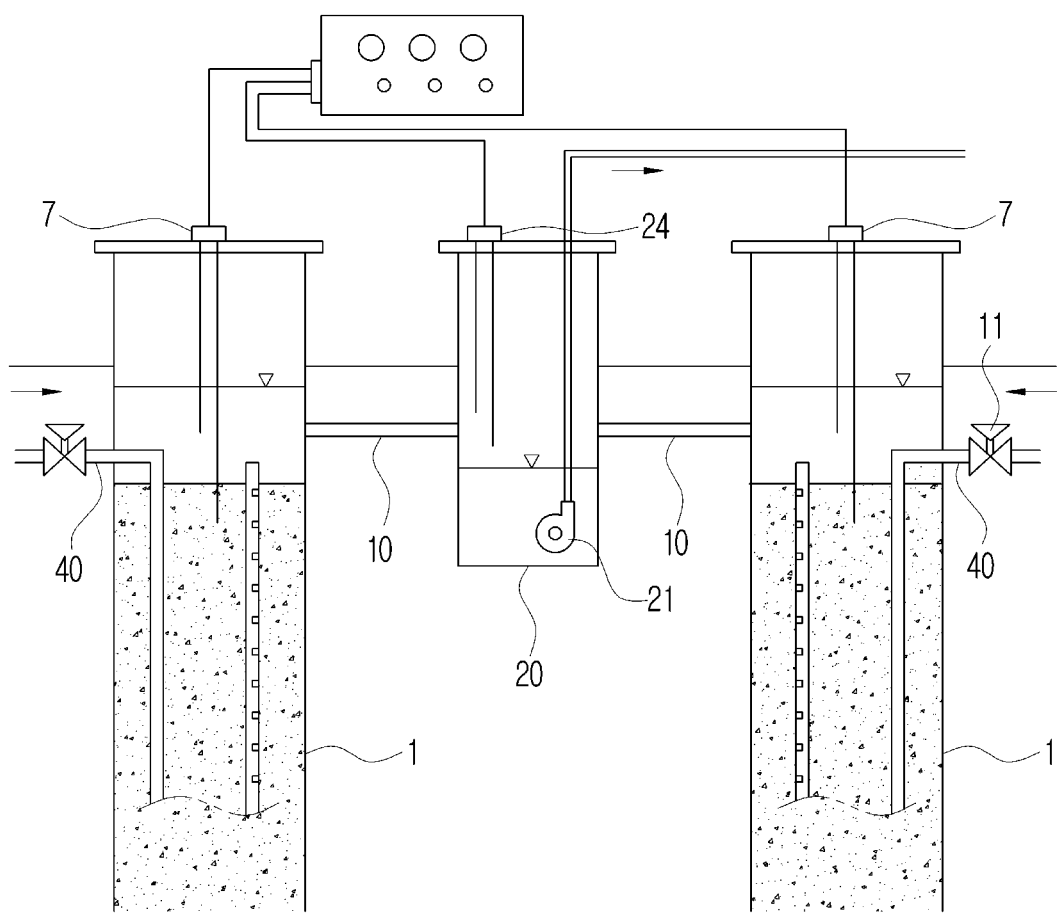

[FIG. 3A]
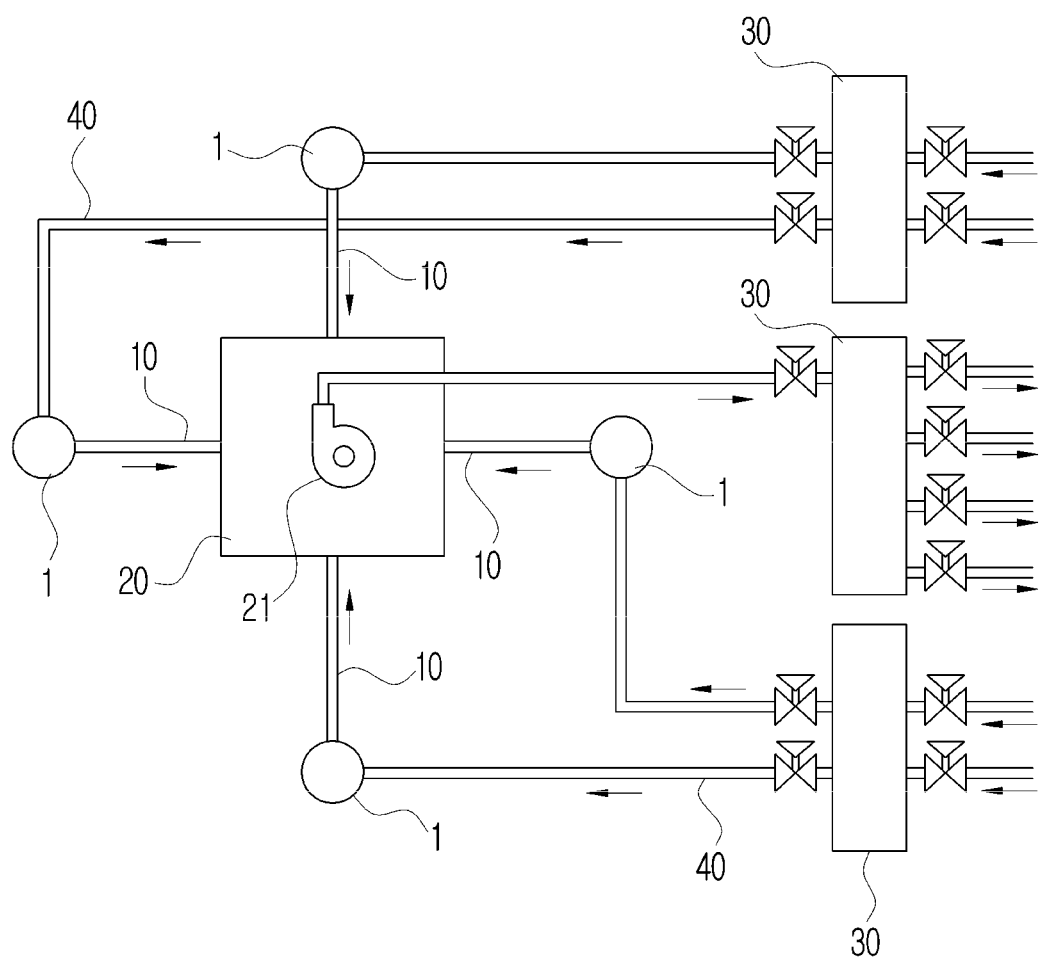

[FIG. 3B]
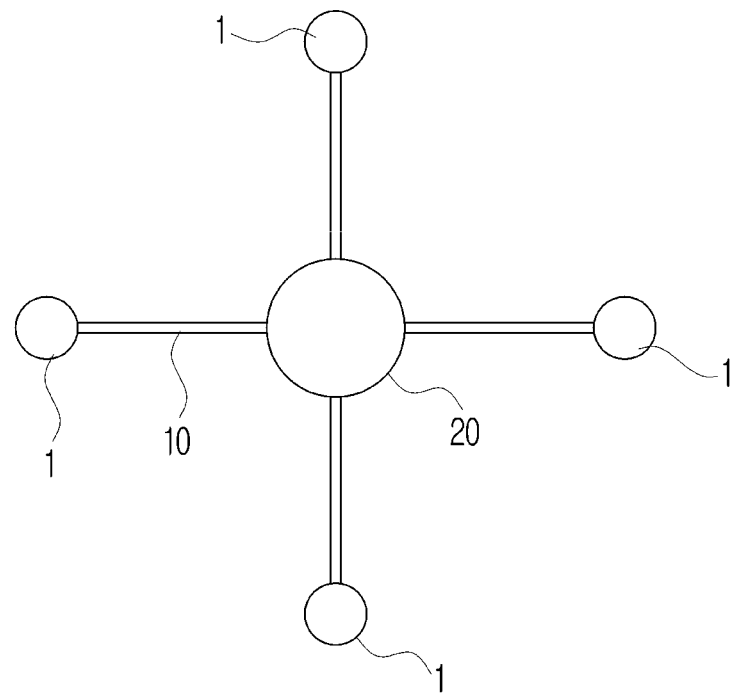
[FIG. 3C]
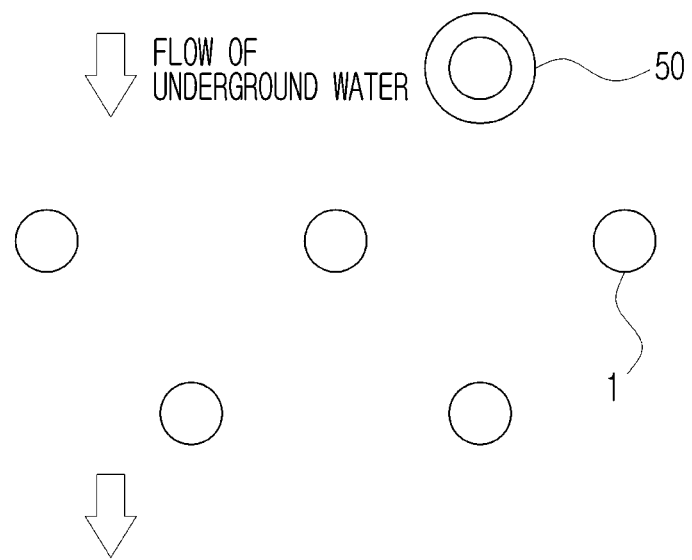

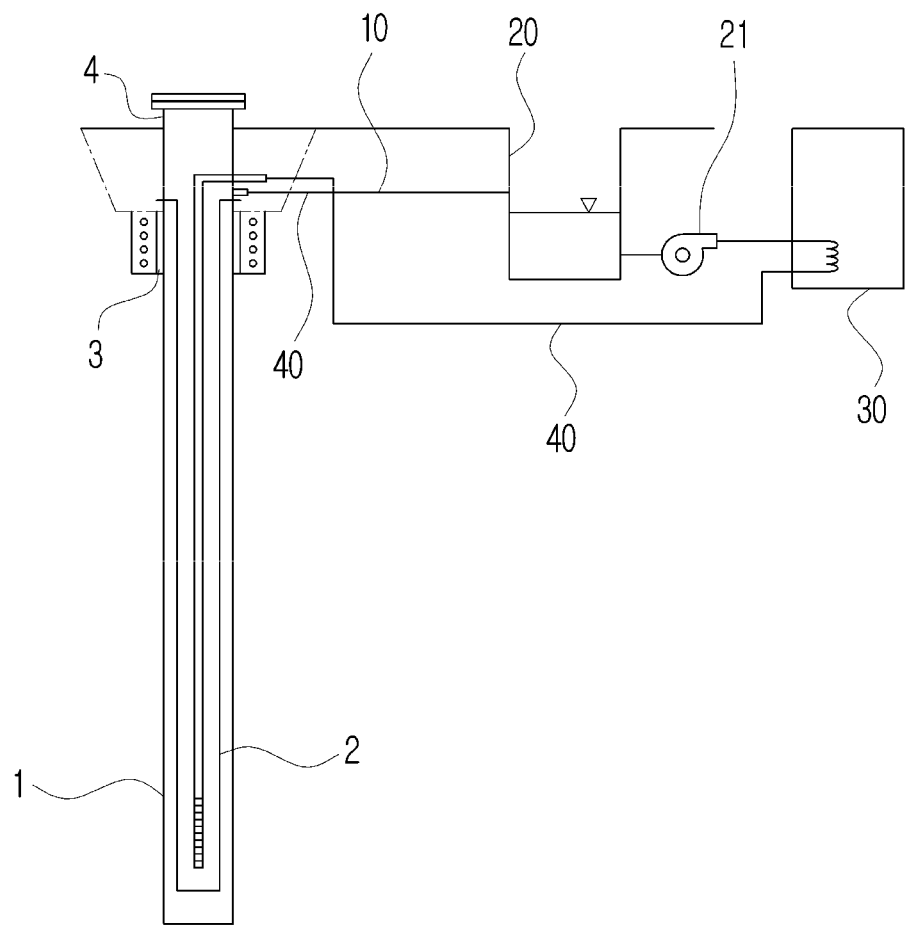
【FIG. 4】

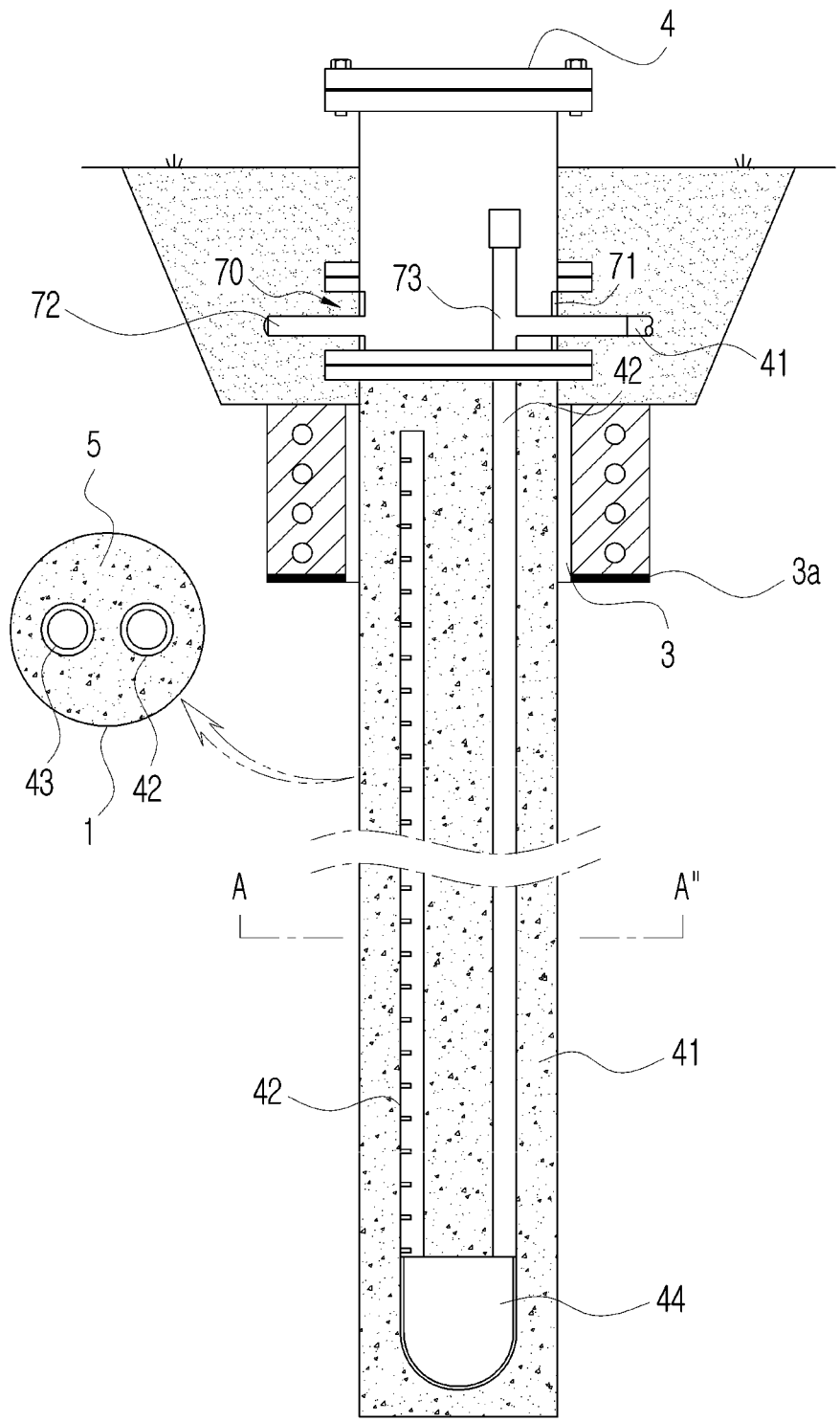
[FIG. 5]

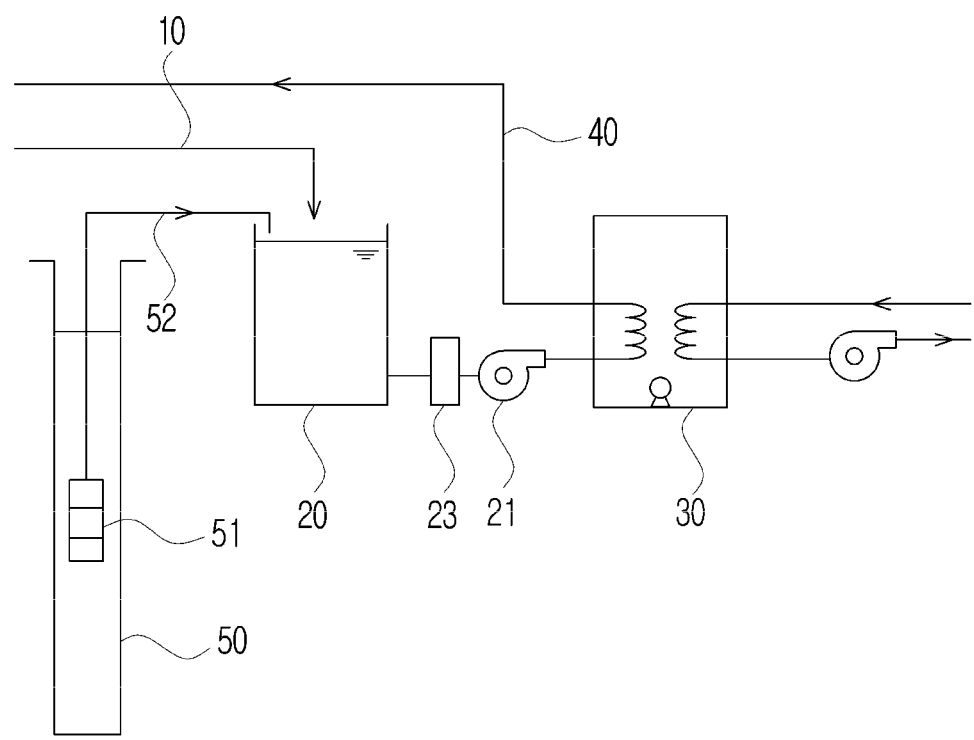
[FIG. 6]

[FIG. 7]
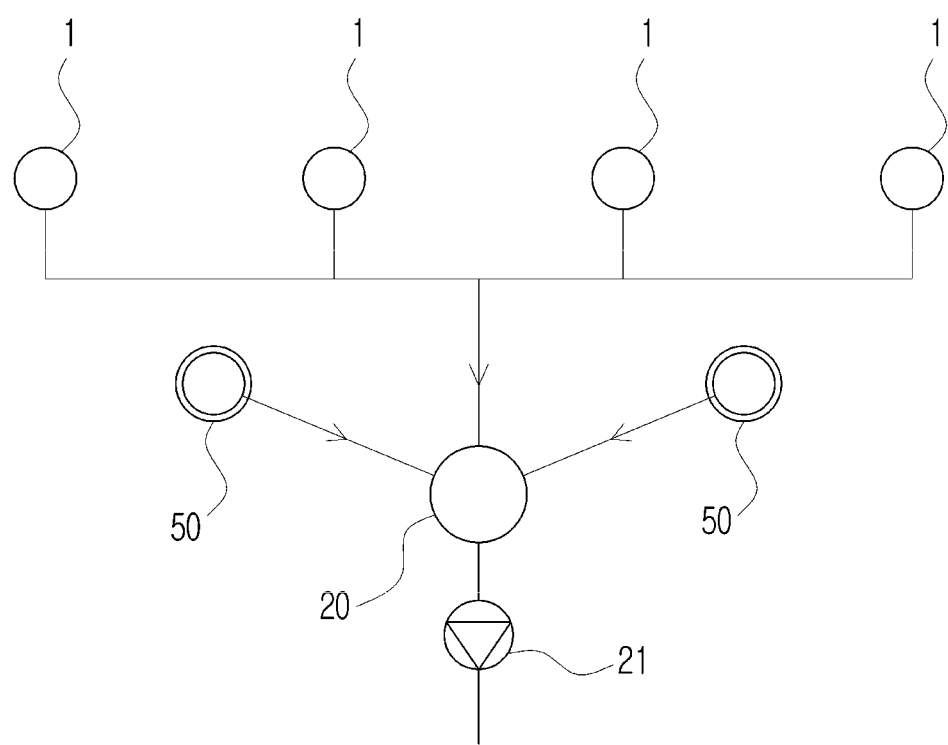

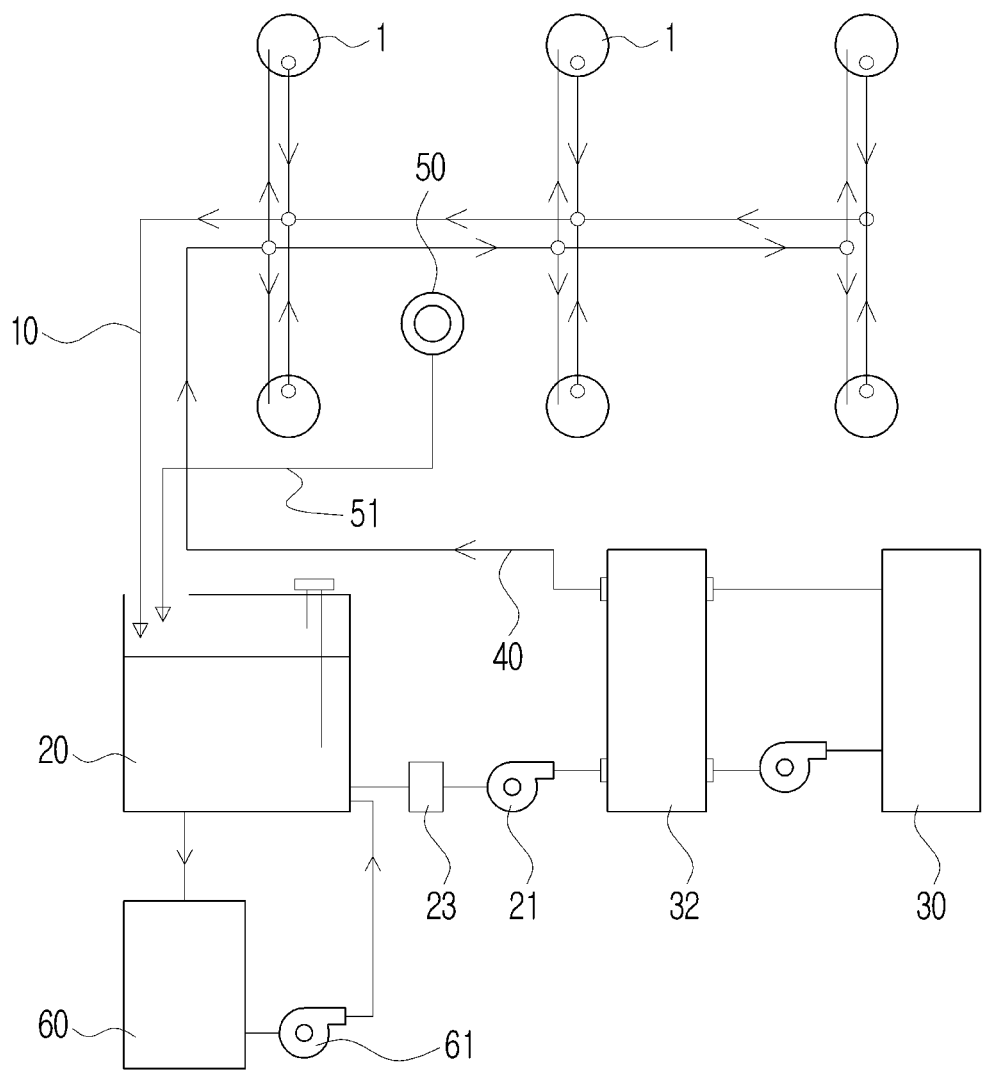
[FIG. 8]

[FIG. 9]
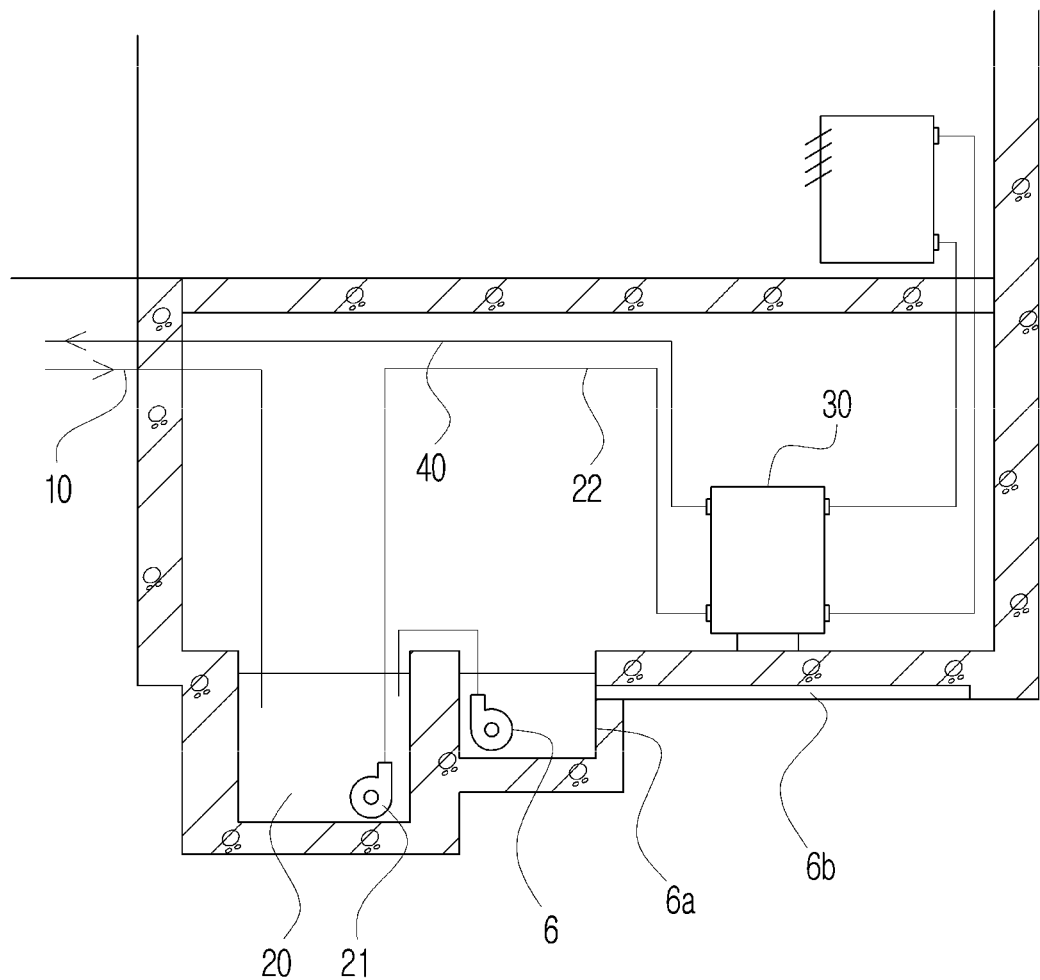

【FIG. 10】
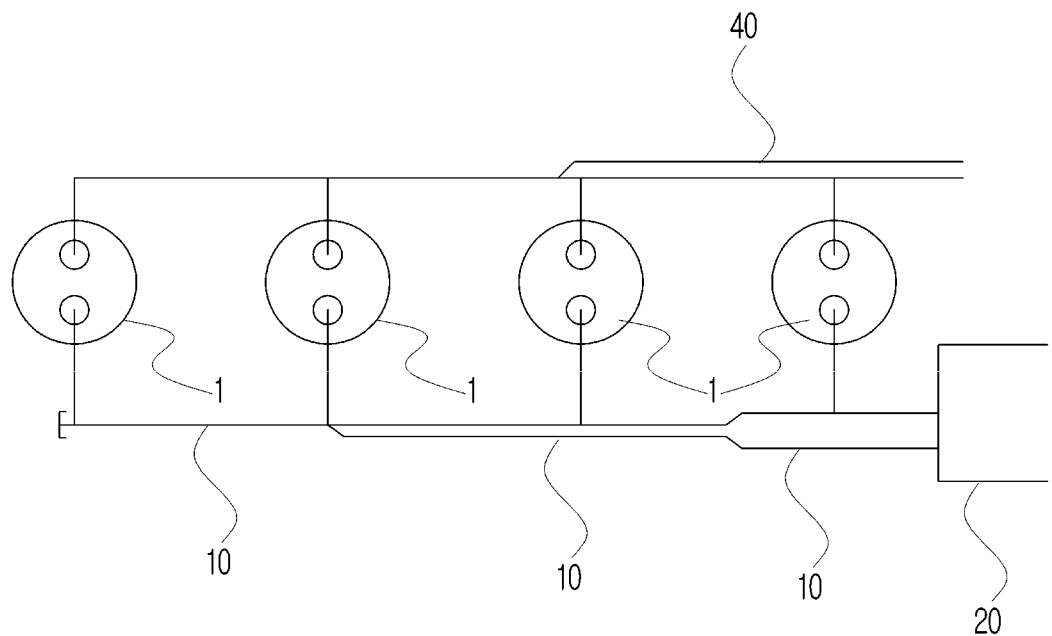

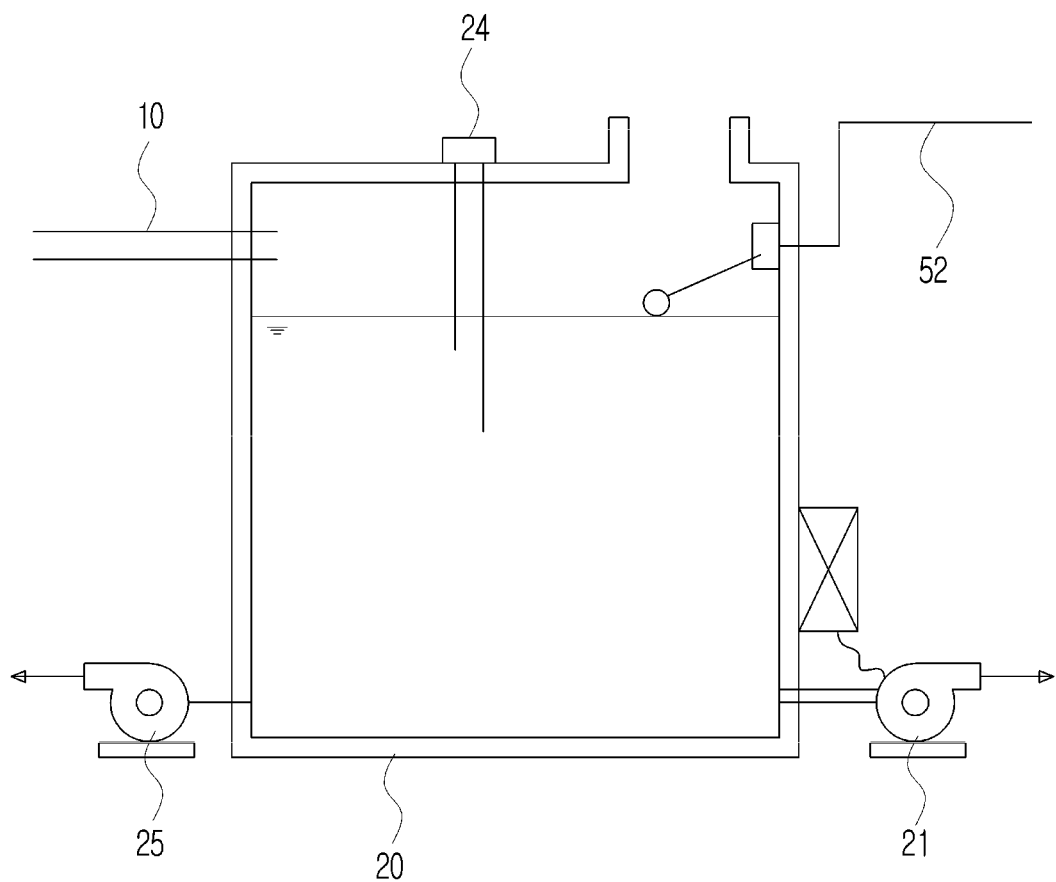
[FIG. 11]

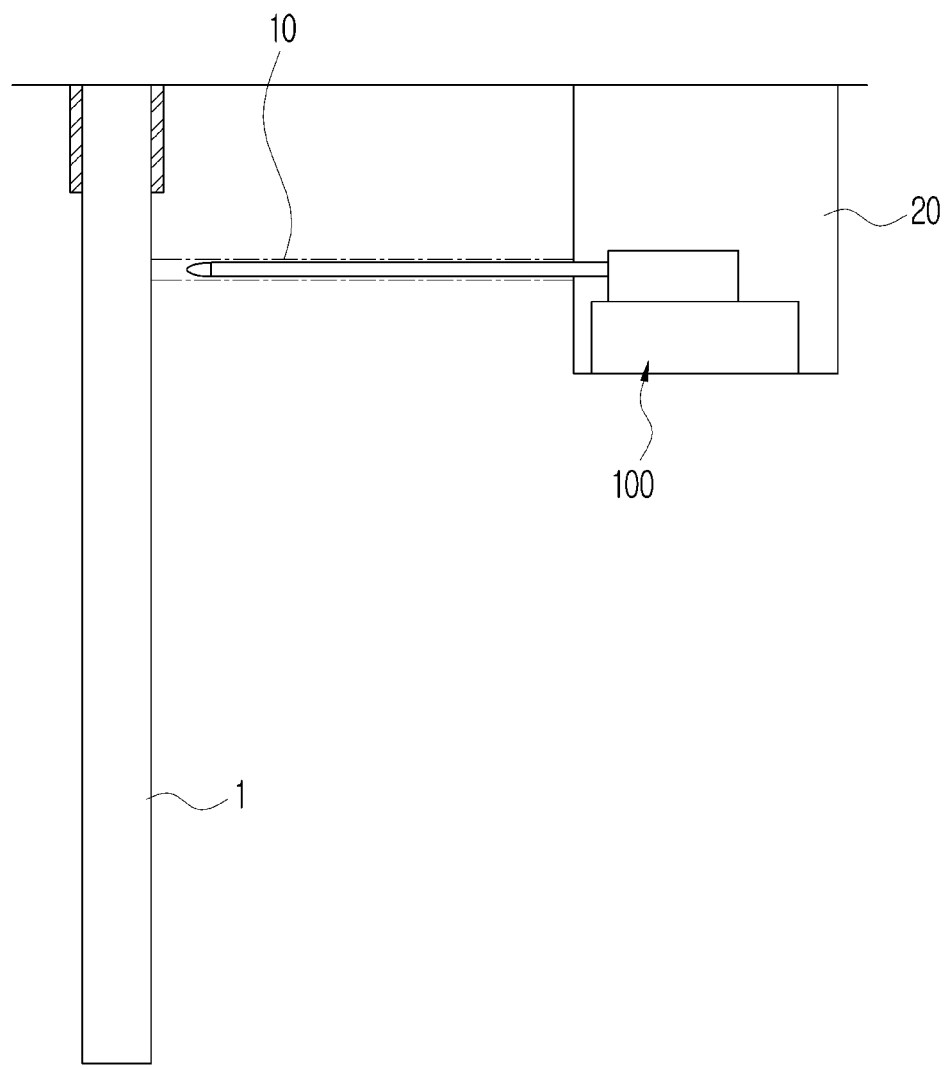
[FIG. 12]

[FIG. 13]
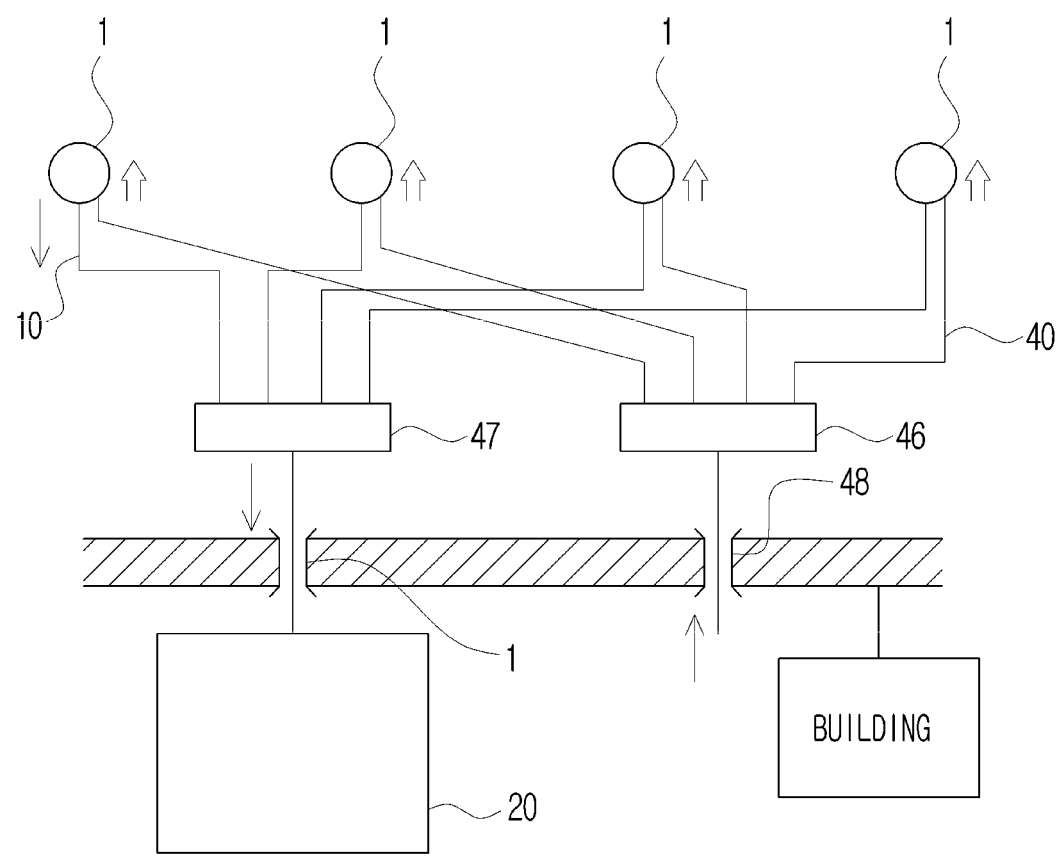

[FIG. 14]
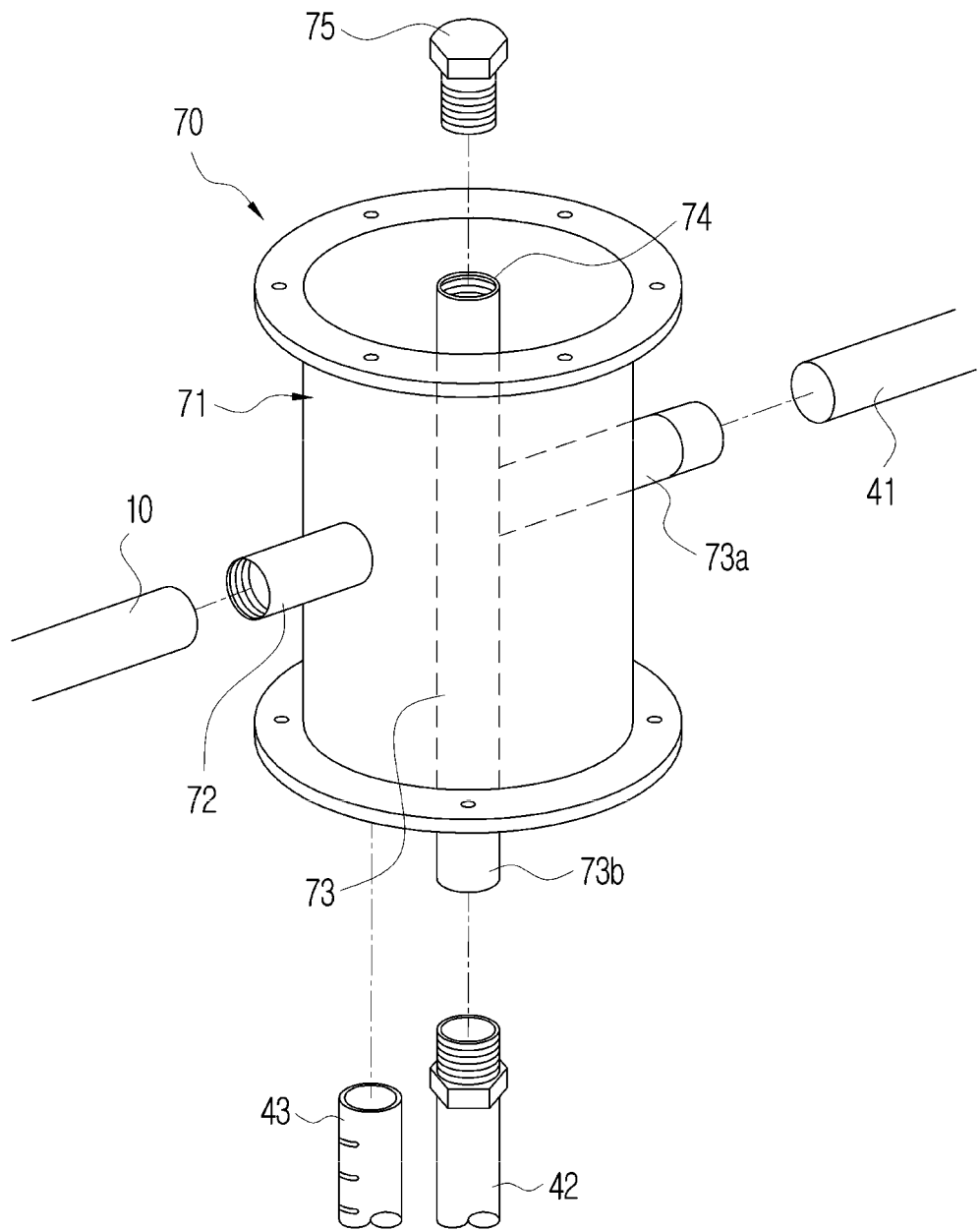

【FIG. 15】
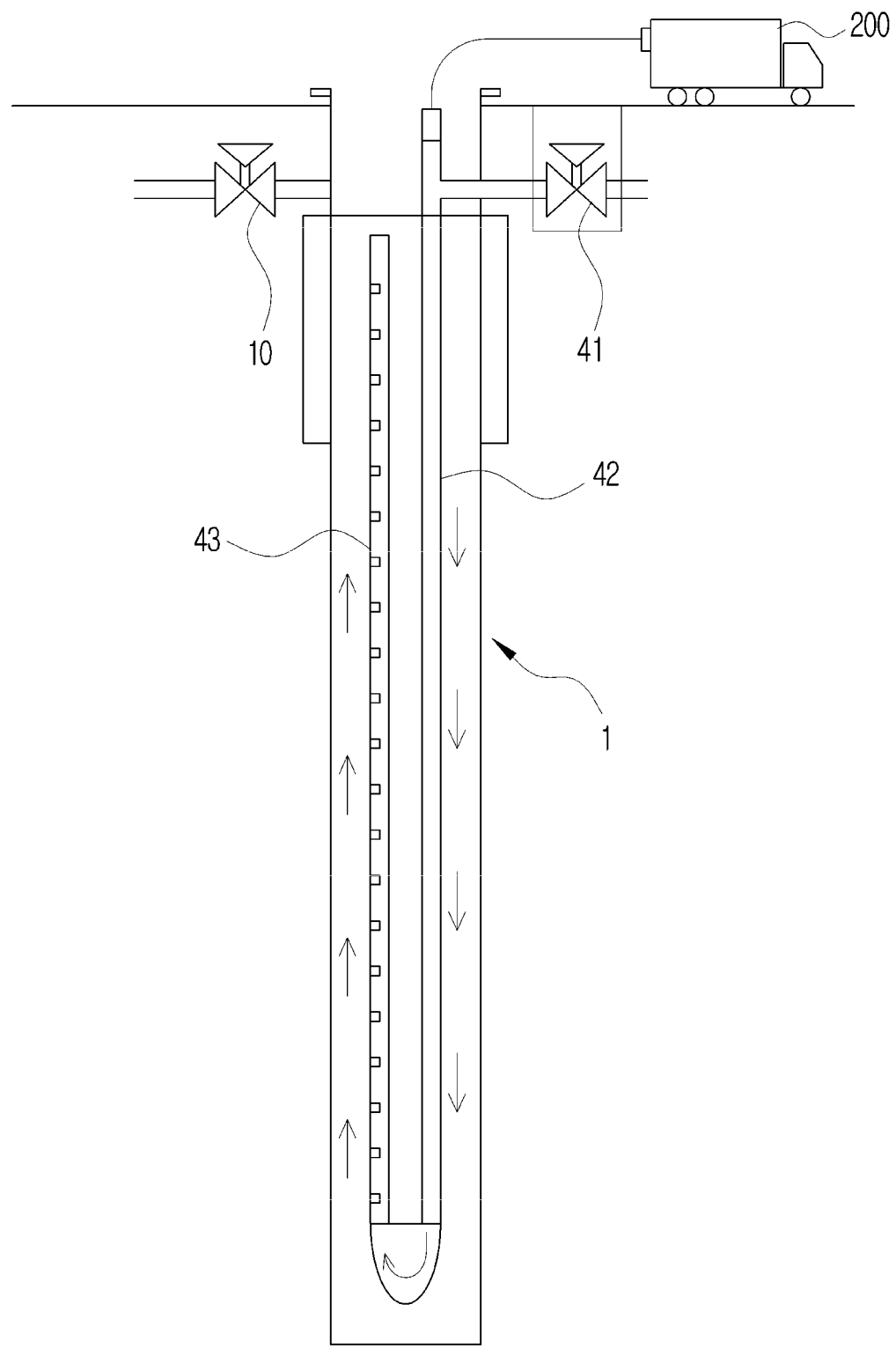

[FIG. 16]
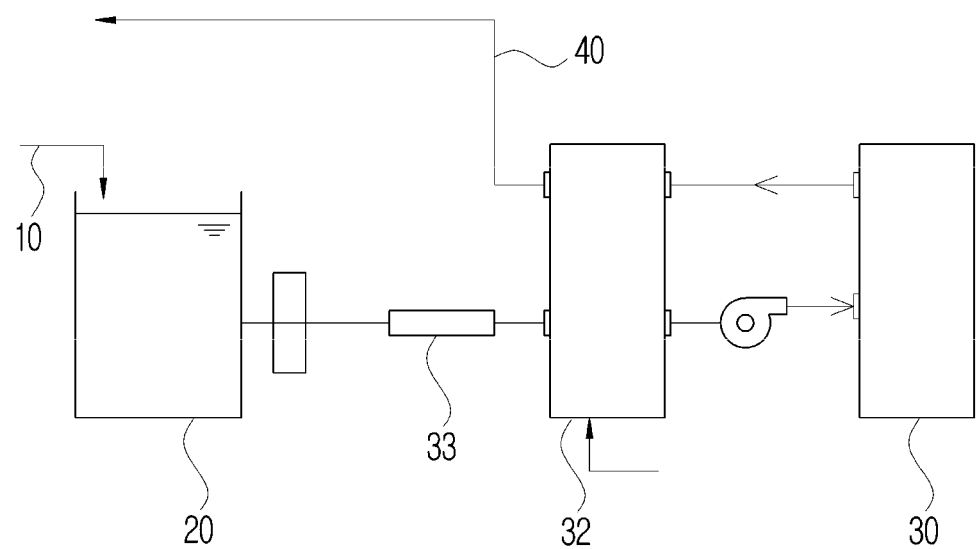

[FIG. 17]
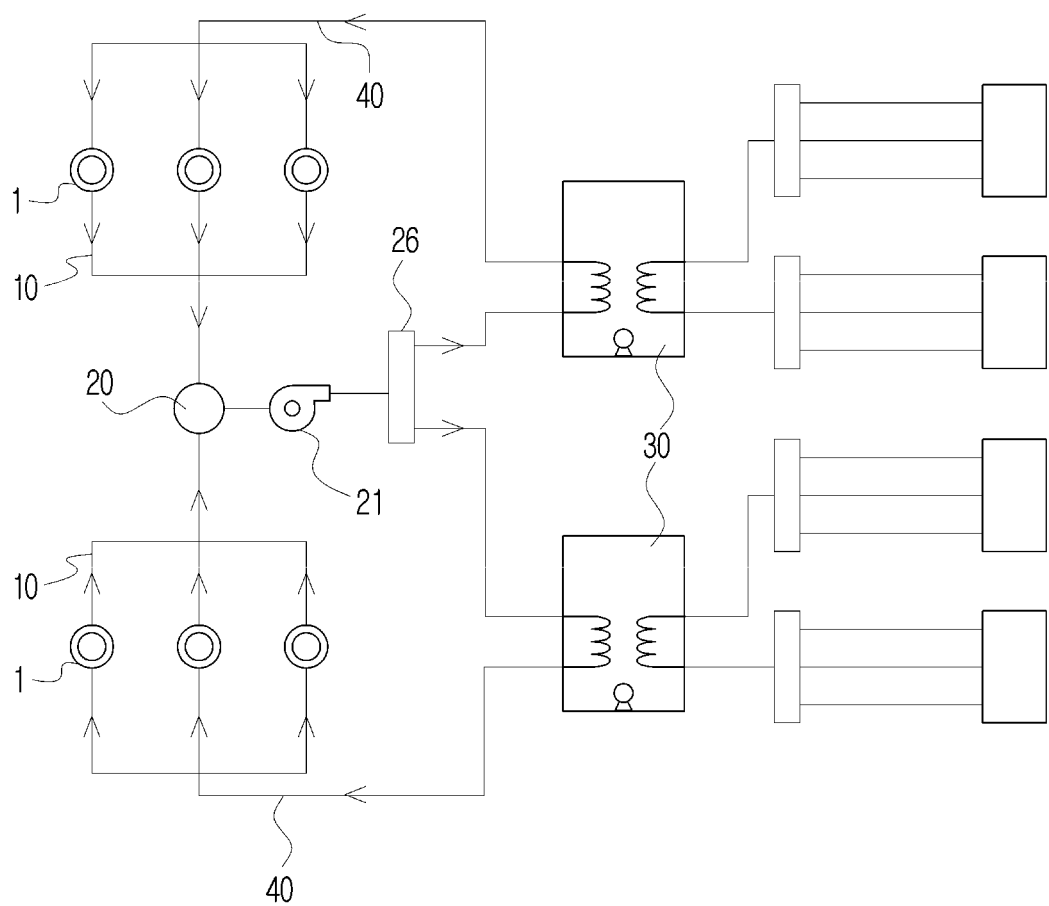

【FIG. 18】
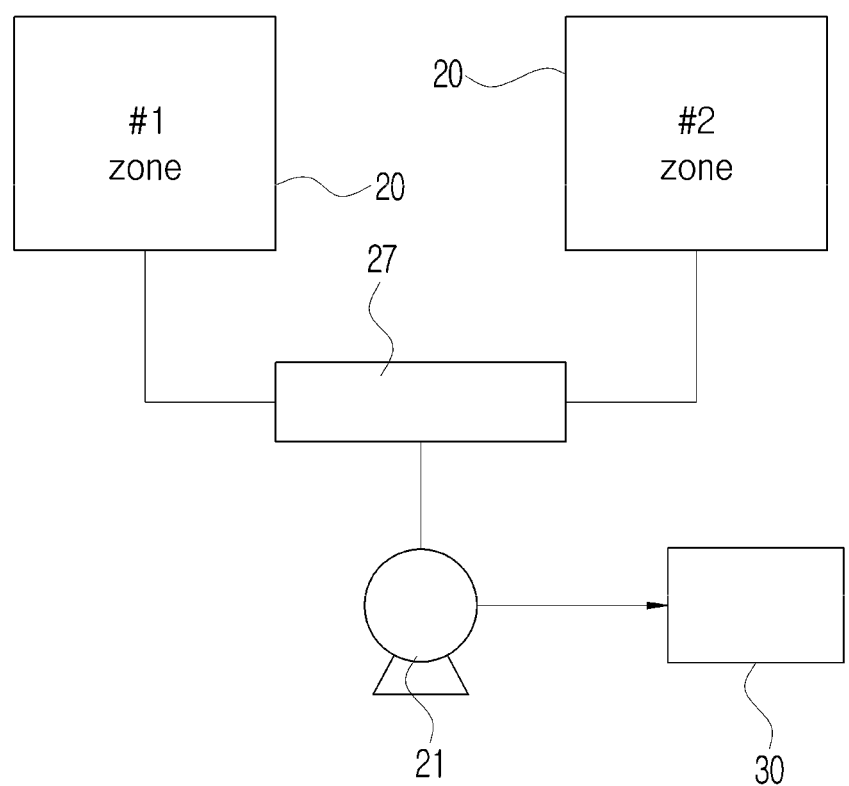

[FIG. 19]
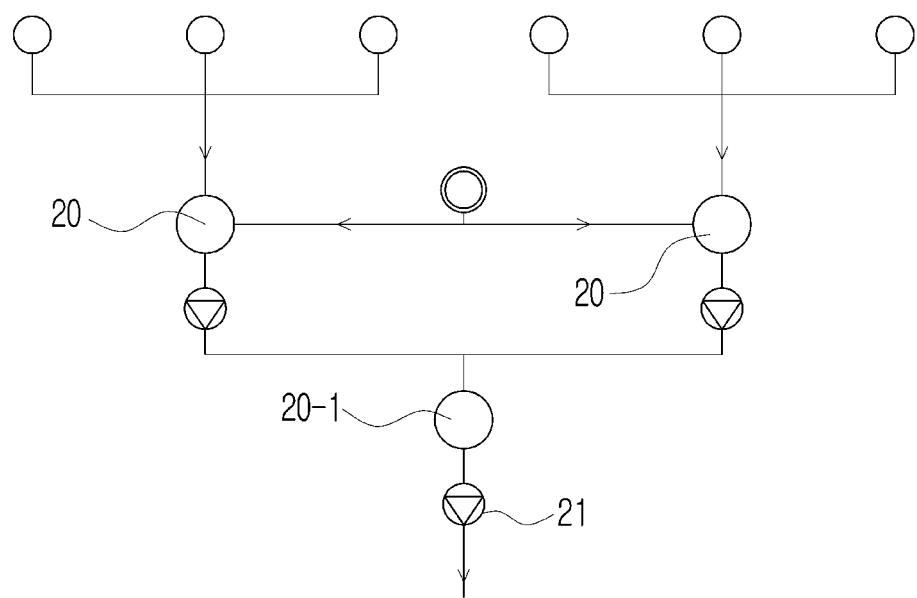

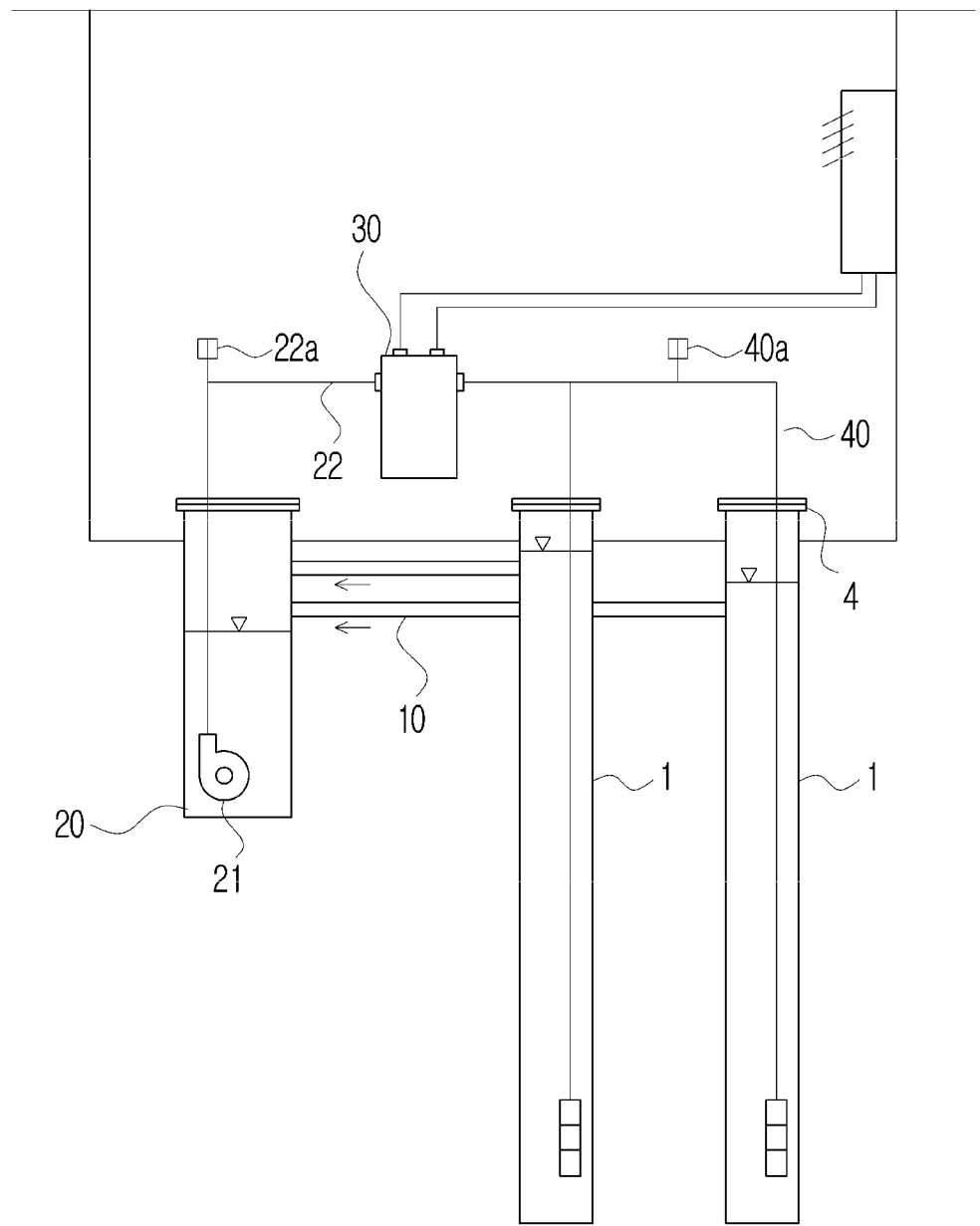
【FIG. 20】

[FIG. 21]
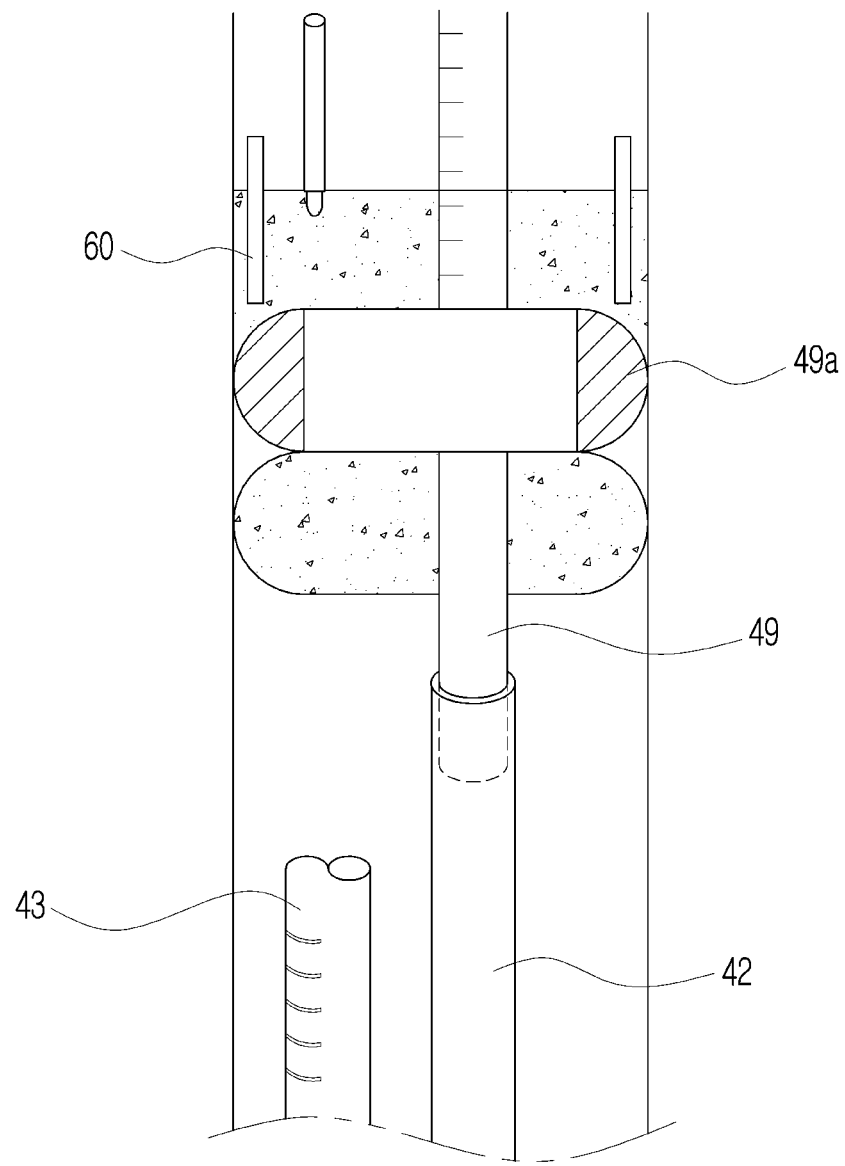

【FIG. 22】
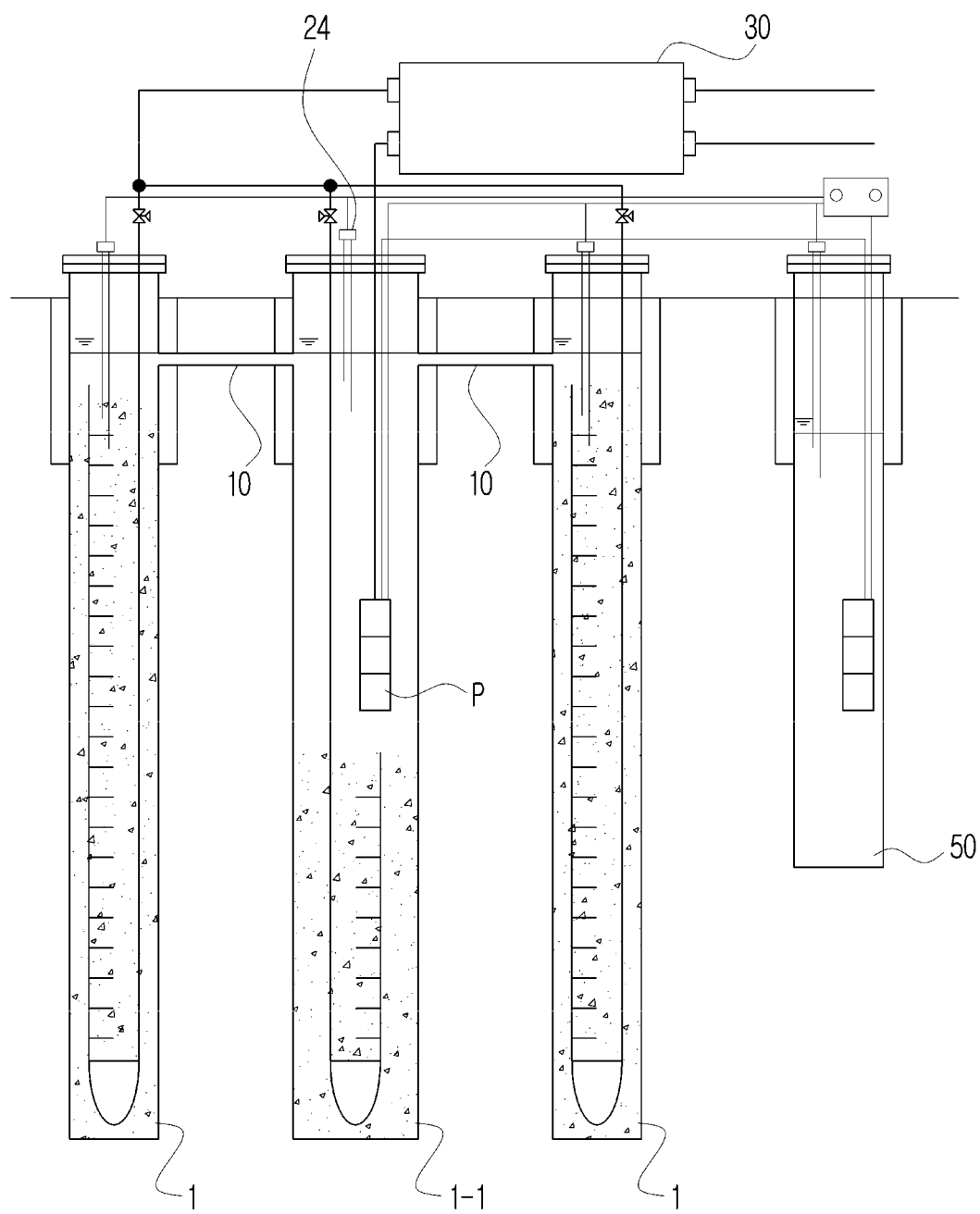

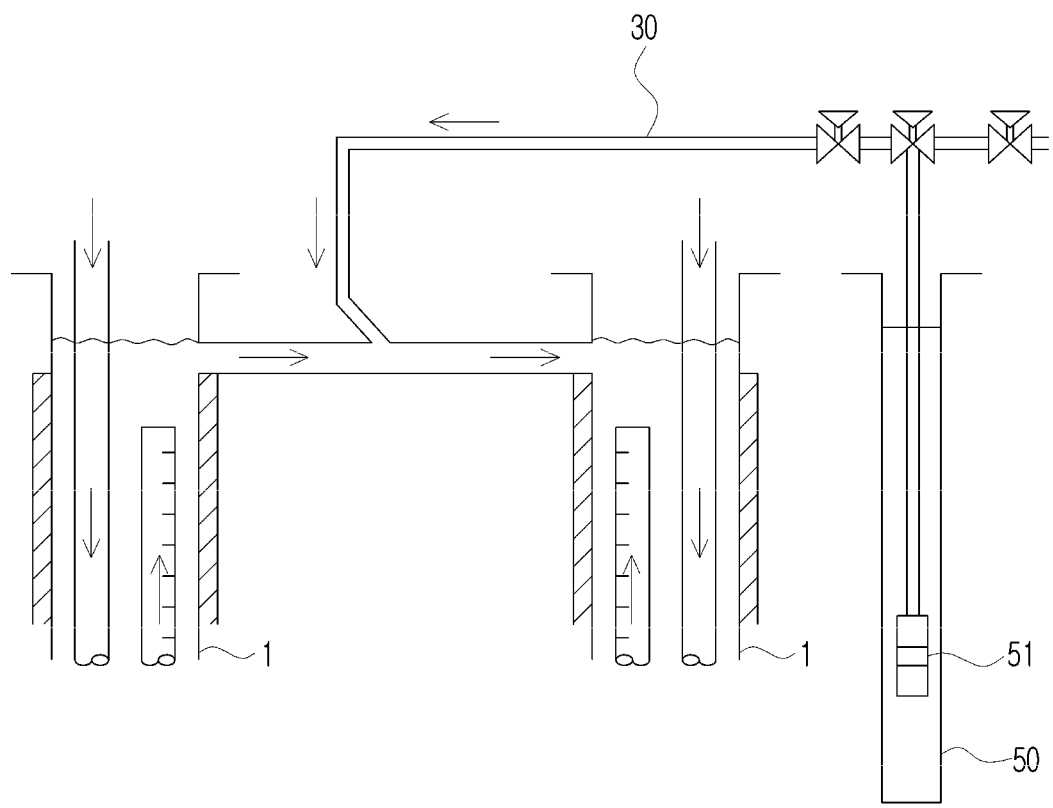
[FIG. 23]

[FIG. 24]
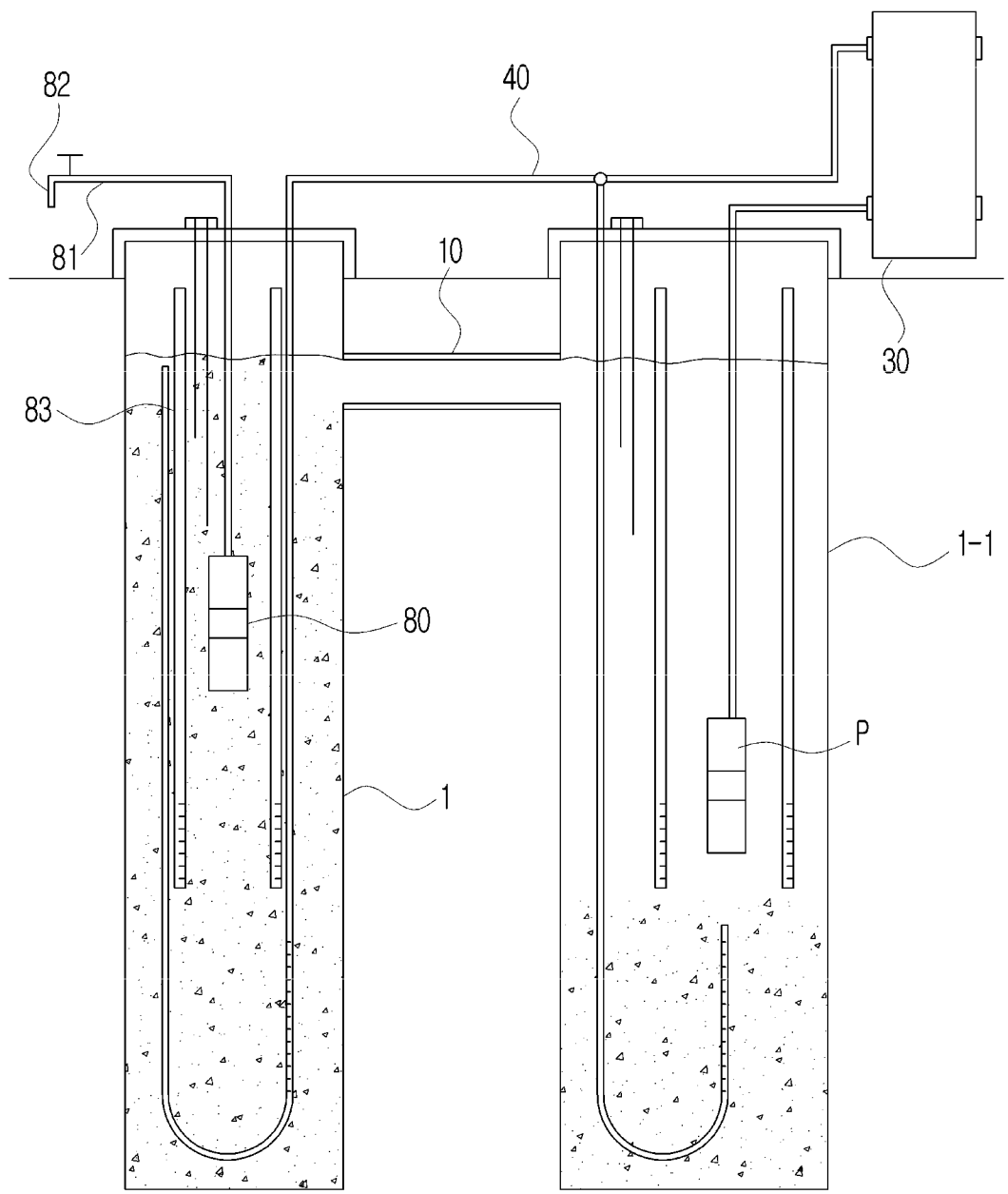

GEOTHERMAL SYSTEM USING SINGLE WATER SUPPLY SYSTEM FOR HEATING AND COOLING SMART FARM AND BUILDING, AND METHOD FOR CONSTRUCTING GEOTHERMAL SYSTEM

CROSS REFERENCE TO PRIOR APPLICATIONS

This application is the 35 U.S.C. 371 national stage of International application PCT/KR2019/016527 filed on Nov. 28, 2019; which claims priority to Korean application 10-2018-0157452 filed on Dec. 7, 2018. The entire contents of each of the above-identified applications are hereby incorporated by reference.

TECHNICAL FIELD

The present invention relates to a geothermal system, and more particularly to a geothermal system using a single water supply system configured to cool and heat a smart farm and a building that is capable of using underground water as water for crop cultivation in the smart farm and water for cooling and heating a room and that is capable of acquiring underground water from a plurality of geothermal holes and supplying the acquired underground water through the single water supply system and a method of constructing the same.

BACKGROUND ART

This section merely provides background information related to the disclosure of the present application and does not necessarily constitute prior art.

Geothermal heat commonly refers to inherent heat of underground water pumped after the ground is excavated and underground heat. A heat exchange system is used in which the ground is excavated so as to generally have a depth of 100 to 500 m from the surface of the ground, a pipe for heat exchange is buried therein or an underground deep water well pump and a water pumping pipe are installed therein to pump underground water, heat of the underground water is used by a heat pump, and the heat-exchanged underground water is returned to an underground deep water well using a water return pipe, in the same manner as in an underground deep water well facility using general underground water.

Underground temperature is maintained at a temperature of 15° C. to 17° C. throughout the year without change. In the case in which underground water having such temperature is pumped such that heat of the underground water is used by the heat pump, it is possible to secure a heat capacity of 4000 kilocalories per hour on the assumption that the amount of underground water pumped by the underground deep water well pump reaches 1000 liters per hour and that the temperature difference is 4° C. The underground water having increased or decreased temperature as the result of heat exchange flows into an underground water geothermal hole via a water return pipe, and heat exchange is performed by underground heat again, whereby the temperature of the underground water is decreased or increased again. The above cycle may be continuously performed. A facility using the above principle is a cooling and heating system using geothermal heat.

An essential facility of the geothermal cooling and heating system is an excavated underground deep water well facility. Particularly, for a facility configured to pump underground water for heat exchange, it is necessary to connect an underground deep water well pump, a pumping pipe, and a water return pipe to the interior of an excavated underground deep water well.

Patent Document (10-1187863) discloses an open type geothermal system having a water return pipe provided at the bottom of a geothermal hole, wherein the geothermal hole and a water supply well are separately provided and a circulation pipe is also provided such that circulating underground water that has exchanged heat in the geothermal hole flows into the water supply well and is circulated to a heat pump in a machinery compartment through an underwater motor pump. However, the construction of a plurality of geothermal holes and the use of a single circulation pump in a water collection and supply well are not described in detail.

DISCLOSURE

Technical Problem

The present invention has been made in view of the above problems, and it is an object of the present invention to provide a geothermal system using a single water supply system configured to cool and heat a smart farm and a building including a plurality of geothermal holes and a single water supply facility (a water supply well or a water supply geothermal hole), wherein the geothermal holes are connected to the water supply facility such that underground water is collected in the water supply facility and is supplied to a heat pump, whereby a single pump can be used even for a large-scale geothermal capacity, and a method of constructing the same.

Technical Solution

A geothermal system using a single water supply system configured to cool and heat a smart farm and a building according to the present invention includes two or more geothermal holes formed underground, a water return means configured to return underground water from the geothermal holes, a water supply means configured to collect the underground water returned by the water return means and to supply the collected underground water, at least one heat pump configured to produce heat for cooling and heating using heat of the underground water supplied from the water supply means as a heat source, and an underground water supply means configured to supply underground water that has supplied heat to the heat pump to the geothermal holes.

Advantageous Effects

In a geothermal system using a single water supply system configured to cool and heat a smart farm and a building according to the present invention and a method of constructing the same, underground water in a plurality of (all) geothermal holes is collected in a water supply facility (a water collection and supply well or a water supply geothermal hole), the collected underground water is supplied to a heat exchanger of a heat pump through the single water supply system, and the heat-exchanged underground water is returned and distributed to the geothermal holes, whereby it is possible to use a single underground water pump even though the geothermal system is of an open type, and therefore it is possible to improve convenience in maintenance and to greatly reduce power consumption.

For the open type geothermal system, operation thereof may be impossible when an operating water level is lowered due to outflow of underground water. However, it is possible to solve instability in operation due to a change in water level of underground water by the provision of a separate replenishment water supply means.

In addition, it is possible to control the operating water level and to manage water quality of underground water through the water supply facility configured to collect all underground water, whereby it is possible to perform maintenance of an environmentally friendly geothermal system.

A vertical hermetically sealed geothermal system has several problems in that heat capacity per unit geothermal hole is small, whereby the number of geothermal holes excavated in a unit construction site is large. In contrast, the open type geothermal system has advantages in that easy maintenance is achieved since a single circulation pump is installed and operated in a machinery compartment, and heat exchange capacity per unit geothermal hole is large, which is a characteristic of the open type geothermal system, whereby it is possible to secure convenience in maintenance, which is a characteristic of the vertical hermetically sealed geothermal system, through unification of the circulation pump using the water collection and supply well while greatly reducing the number of geothermal holes excavated in a unit construction site.

Also, in the case in which an open type single circulation pump system configured such that a plurality of geothermal circulation wells having a depth of 30 to 50 m is excavated and underground water from the geothermal circulation wells is collected in a water collection and supply well is operated as a geothermal facility for maintaining appropriate cooling temperature in a smart farm provided in a damp ground of a tropical region having plentiful shallow underground water, such as Southeast Asia, it is possible to economically and efficiently maintain the facility.

Conventionally, in the case in which a large amount of shallow underground water having a small depth is present, as in Southeast Asia, geothermal holes must be excavated and an underwater motor pump for deep wells must be installed and operated in each of the geothermal holes in order to utilize heat of plentiful underground water. According to the present invention, however, a single water supply facility is provided and a single circulation pump system is configured, whereby it is possible to reduce construction cost and to reduce operation and maintenance expenses through structural simplification, and therefore it is possible to improve an environment in which the smart farm is operated.

DESCRIPTION OF DRAWINGS

FIG. 1 is front view showing the overall configuration of a geothermal system using a single water supply system configured to cool and heat a smart farm and a building according to the present invention.

FIGS. 2A to 3C are views showing examples in which a water collection and supply well of the geothermal system using the single water supply system configured to cool and heat the smart farm and the building according to the present invention is disposed between geothermal holes.

FIG. 4 is a view showing an example in which an inner casing is applied to the geothermal system using the single water supply system configured to cool and heat the smart farm and the building according to the present invention and a different supply pipe is used.

FIG. 5 is a view showing an example in which a connection socket is applied to the geothermal system using the single water supply system configured to cool and heat the smart farm and the building according to the present invention.

FIGS. 6 and 7 are a front view and a plan view showing an example in which an underground water hole for replenishment water is applied to the geothermal system using the single water supply system configured to cool and heat the smart farm and the building according to the present invention, respectively.

FIG. 8 is a view showing an example in which a water purifier is applied to the geothermal system using the single water supply system configured to cool and heat the smart farm and the building according to the present invention.

FIG. 9 is a view showing an example in which dewatering drainage technology is applied to the geothermal system using the single water supply system configured to cool and heat the smart farm and the building according to the present invention.

FIG. 10 is a view showing an example in which a plurality of water return and circulation pipes is expanded in the geothermal system using the single water supply system configured to cool and heat the smart farm and the building according to the present invention.

FIG. 11 is an illustrative view of a water collection and supply well applied to the geothermal system using the single water supply system configured to cool and heat the smart farm and the building according to the present invention.

FIG. 12 is an illustrative view of installation of a water return and circulation pipe applied to the geothermal system using the single water supply system configured to cool and heat the smart farm and the building according to the present invention.

FIG. 13 is a view showing an example in which a geothermal hole and a water collection and supply well applied to the geothermal system using the single water supply system configured to cool and heat the smart farm and the building according to the present invention are installed in the state in which a building wall is disposed therebetween.

FIG. 14 is a perspective view of a connection socket applied to the geothermal system using the single water supply system configured to cool and heat the smart farm and the building according to the present invention.

FIG. 15 is a view showing a cleaning example of the geothermal system using the single water supply system configured to cool and heat the smart farm and the building according to the present invention.

FIG. 16 is a view showing an anti-scaling device applied to the geothermal system using the single water supply system configured to cool and heat the smart farm and the building according to the present invention.

FIG. 17 is a view showing an example in which a plurality of heat pumps is connected to a single water collection and supply well applied to the geothermal system using the single water supply system configured to cool and heat the smart farm and the building according to the present invention.

FIG. 18 is a view showing an example in which a plurality of water collection and supply wells applied to the geothermal system using the single water supply system configured to cool and heat the smart farm and the building according to the present invention is connected to a single main header.

FIG. 19 is a view showing an example in which water collection and supply wells of a single water supply system for water collection and supply wells configured to cool and heat a smart farm and a building according to the present invention are assigned to partitioned zones and are then connected to a main water collection and supply well.

FIG. 20 is a view showing an example in which the single water supply system for water collection and supply wells configured to cool and heat the smart farm and the building according to the present invention is applied to the basement of a building.

FIG. 21 is a view showing an example in which a geothermal hole applied to the geothermal system using the single water supply system configured to cool and heat the smart farm and the building according to the present invention is excavated before construction work.

FIG. 22 is a view showing an example in which a water supply geothermal hole is applied to the geothermal system using the single water supply system configured to cool and heat the smart farm and the building according to the present invention instead of a water collection and supply well.

FIG. 23 is a view showing an example in which the geothermal system using the single water supply system configured to cool and heat the smart farm and the building according to the present invention directly supplies underground water without using a water collection and supply well.

FIG. 24 is a view showing technology for supplying tap water to the geothermal system using the single water supply system configured to cool and heat the smart farm and the building according to the present invention.

DESCRIPTION OF REFERENCE NUMERALS

1: Geothermal hole, 1-1: Water supply geothermal hole
2: Inner casing, 3: Grouting casing
4: Upper protective hole, 5: Filler
6: Drainage pump
10: Water return and circulation pipe, 11: Valve
20: Water collection and supply well, 21: Circulation pump
22: Pipe, 23: Filtration tank
24: Water level sensor, 25: Drainage pump
26: Distribution header, 27: Main header
30: Heat pump, 31: Load-side heat exchanger
32: Heat exchanger, 33: Anti-scaling device
40: Supply pipe, 41: Ground-side supply portion
42: Geothermal-hole-side supply portion, 43: Water return portion
50: Underground water hole for replenishment water, 51: Replenishment pump
52: Replenishment pipe, 60: Water purifier
70: Connection socket, 80: Cylindrical body

BEST MODE

In describing the present invention hereinafter, a detailed description of related known functions and configurations will be omitted when the same may obscure the subject matter of the present invention. In addition, terminologies used herein are defined in consideration of functions in the present invention, and may be varied depending upon intention of users or operators or usual practices. Consequently, the definition thereof should be given based on the disclosure in this specification.

As shown in FIGS. 1 and 2A, a geothermal system using a single water supply system configured to cool and heat a smart farm and a building according to the present invention includes a geothermal hole 1 formed underground, a water return and circulation pipe 10 configured to return underground water in the geothermal hole 1, a water collection and supply well 20 configured to collect and store the underground water returned by the water return and circulation pipe 10, a heat pump 30 configured to produce heat for cooling and heating using heat of the underground water collected in the water collection and supply well 20 as a heat source, and a supply pipe 40 configured to supply the underground water that has been discharged from the water return and circulation pipe 10 and has exchanged heat with the heat pump 30 to the geothermal hole 1.

FIG. 1 shows that geothermal holes 1 are disposed on one side of the water collection and supply well 20, and FIG. 2 shows that the geothermal holes 1 are disposed on opposite sides of the water collection and supply well 20.

In addition, FIGS. 3A and 3B show examples in which the geothermal holes 1 are disposed around the water collection and supply well 20.

That is, in the present invention, only a single water collection and supply well 20 is provided for two or more geothermal holes 1, whereby only one circulation pump is used. Of course, a single geothermal hole 1 and a single water collection and supply well 20 may also be used.

Meanwhile, the water collection and supply well 20 may be located upstream of the geothermal hole 1 in consideration of the flow of underground water. Consequently, underground water that has not exchanged heat with underground heat may be used as replenishment water in the water collection and supply well 20, whereby it is possible to improve overall efficiency of the geothermal system.

In addition, an underground water hole 50 applied to a replenishment water supply means, a description of which will follow, may be located upstream of the geothermal hole 1 or the water collection and supply well 20 in order to supply underground water using natural flow thereof, as shown in FIG. 3C.

In the present invention, construction processes are performed in the order of construction of the geothermal hole, construction of a water supply means, connection between the water supply means and the geothermal hole via a water return means, installation of the heat pump and connection between the heat pump and the water supply means, and connection between the heat pump and the geothermal hole via the supply pipe.

In the process of construction of the geothermal hole, in which two or more geothermal holes 1 are constructed underground, the ground is excavated using a general excavator to construct the geothermal holes 1.

In the process of construction of the water supply means, the water collection and supply well 20 or a water supply geothermal hole 1-1 is constructed in the vicinity of the geothermal hole 1.

In the process of connection between the water supply means and the geothermal hole via the water return means, the water return and circulation pipe 10 is installed in order to collect underground water in the geothermal hole 1 to the water supply means.

In the process of installation of the heat pump and connection between the heat pump and the water supply means, a pipe and a pump are installed between the water supply means and the heat pump 30 in order to supply heat of the underground water collected in the water supply means to the heat pump 30.

In the process of connection between the heat pump and the geothermal hole via the supply pipe, the supply pipe 40 is installed in order to supply the underground water that has passed through the heat pump 30, whereby the heat of the underground has been transferred to the heat pump, to the geothermal hole 1.

The above construction processes will be clearly understood from a detailed description of the above components, which will be given below.

<Geothermal Hole>

The geothermal hole 1 is formed by excavating the ground so as to generally have a depth of 200 to 500 m from the surface of the ground.

An inner casing 2 (see FIG. 4) may be installed in the geothermal hole 1 in order to prevent collapse of the geothermal hole 1.

It is necessary for the inner casing 2 to have a perforated portion (formed at a portion or the entirety thereof) in order to circulate underground water. A dual pipe having a perforated portion and a non-perforated portion may also be possible. In the case in which the inner casing 2 is applied, the water return and circulation pipe 10 and the supply pipe 40 may be freely applied based on the structure of the inner casing 2.

Each of the inner casing 2 and the supply pipe 40 is made of a PE material for economical construction, and a load addition member is coupled thereto at the time of installation thereof in order to reduce buoyancy.

As shown in FIG. 4, a grouting casing 3 is fitted on the geothermal hole 1 and cement grouting is performed between the wall of the geothermal hole and the grouting casing 3 such that a protective wall is provided under the surface of the ground in order to prevent pollution of circulating underground water due to inflow of polluted upper-stratum underground water according to an underground water law.

At this time, in the case in which an underground tunnel or the basement of a multistory building is located in the vicinity of the geothermal hole or in the case in which a river is located in the vicinity of the geothermal hole, underground water may flow downwards thereto, whereby the operation level of the circulating underground water may be lowered. In order to solve this problem, a shielding device 3a specified in the underground water law is installed at the lower end of the grouting casing 3, wherein a product having a high-depth function is selected and cement grouting for the protective wall under the surface of the ground is performed in order to construct a cutoff wall to a sufficient depth, at which underground water does not flow out, depending on a surrounding environment.

For economical excavation, the geothermal hole 1 is excavated such that a pollution prevention section of the geothermal hole has a diameter of 250 mm, which is a legal thickness, and the other section of the geothermal hole has a diameter of 150 mm. In order to prevent outflow of underground water, however, the geothermal hole may be excavated such that the excavated section of the geothermal hole has a diameter of 200 mm.

In addition, as shown in FIG. 4, an upper protective hole 4 may be applied to the upper part of the geothermal hole 1.

The upper protective hole 4 is opened and closed by an inspection cover, and the supply pipe 40 and the water return and circulation pipe 10 are coupled to each other. The inspection cover is separably coupled to the upper protective hole 4 by bolt-nut coupling.

One or more geothermal holes 1 may be used, and each of the geothermal holes may have a diameter of 200 mm or more in order to increase heat transfer area therein.

In addition, the geothermal hole 1 may be filled with a filler 5 (see FIG. 5), such as bean gravel, in order to prevent collapse of the geothermal hole 1.

As shown in FIG. 2B, water level sensors 7 and 24 are installed in the geothermal hole 1 and the water collection and supply well 20, respectively, and a pump 21 and a valve may be controlled under control of a controller.

A water level sensor and a control circuit are provided in the upper protective hole located at the upper part of the geothermal hole 1 such that the water level in the geothermal hole is properly controlled to be a level higher than the water return and circulation pipe 10, whereby the amount of water supplied into the geothermal hole is controlled such that the geothermal hole can be operated at a proper level.

Meanwhile, in the case in which the water collection and supply well 20 or the underground water hole 50 for replenishment water is provided and used, it is possible to maximally increase the water level in the geothermal hole 1, whereby it is possible to easily control the operation thereof, compared to the configuration of the water collection and supply well 20 in which an underwater circulation pump is installed in the geothermal hole 1. In the case in which the operating water level is increased, as described above, it is possible to increase the heat exchange length of the geothermal hole 1 and it is also possible to increase heat exchange capacity of the geothermal hole 1.

<Technology Capable of Preventing Outflow of Underground Water During Operation>

In order to prevent underground water from flowing outside from an upper stratum portion, thereby preventing lowering in water level, the grouting cutoff wall is inserted to a depth at which outflow of underground water does not occur.

Meanwhile, in the case in which the geothermal hole is located in the basement and the water collection and supply well 20 is inevitably located thereabove, the interior of the geothermal hole including the interior of the upper protective hole 4 may be operated in a state in which operating water pressure equal to or higher than atmospheric pressure is applied thereto. At this time, underground water may flow out to a fracture zone or an aquifer in the geothermal hole 1. As a result, operating water pressure may be lowered, operating water level in the geothermal hole may be lowered, the return amount of circulating underground water may be reduced, and operating water level in the water collection and supply well may be lowered. In order to solve this problem, a replenishment water supply means configured to replenish underground water is included.

The replenishment water supply means includes an underground water hole 50 for replenishment water as a basic component.

The underground water hole 50 for replenishment water is excavated in the vicinity of the geothermal hole 1, and a pump is installed therein to replenish underground water depending on the operating water level in the water collection and supply well 20. Of course, it is also possible to install a water return pipe in the underground water hole for replenishment water.

A plurality of underground water holes for replenishment water may be installed and used depending on the outflow amount of underground water. Most of underground water that flows out from the geothermal hole 1 flows into the underground water hole for replenishment water installed in the vicinity of the geothermal hole 1 and then flows into the water collection and supply well 20 through the replenishment water pump, whereby overall outflow and inflow of underground water in the vicinity of the geothermal hole 1 may be in equilibrium.

For example, in order to prevent lowering in water level of the geothermal hole 1 due to outflow of underground water, the underground water hole 50 (see FIGS. 6 and 8) for replenishment water is separately excavated, and a replenishment pump 51 (an underwater pump) is installed therein to supply collected underground water to the water collection and supply well 20 via a replenishment pipe 52.

On and off of the replenishment pump 51 may be automatically controlled based on the water level in the water collection and supply well 20, or may be controlled by manual manipulation of an operator.

As shown in FIG. 7, two underground water holes 50 for replenishment water may be used together with a plurality of geothermal holes 1. Of course, one underground water hole 50 for replenishment water may be applied, as shown in FIG. 8.

Of course, in a region in which water permeability is high and thus loss of underground water is high, an inner casing 2 having a closed lower part may be installed in the geothermal hole 1 such that circulating underground water is circulated through the supply pipe and the inner casing so as to perform heat exchange and then flows into the water collection and supply well 20 via the water return and circulation pipe 10, as shown in FIG. 4.

Of course, the grouting casing 3 may be sufficiently fitted on the geothermal hole to a depth at which underground water can flow out and cement grouting may be performed for the cutoff wall, whereby it is possible to prevent outflow of underground water to the vicinity of the geothermal hole due to a high operating water level.

Meanwhile, replenishment of water to the water collection and supply well 20 may be performed using a dewatering drainage system applied to a building. That is, the discharge side of a drainage pump 6 installed in a dewatering water tank 6a applied to the dewatering drainage system is connected to the water collection and supply well 20 such that water gathered in the building is pumped using the drainage pump 6 and is then supplied to the water collection and supply well 20. In the figure, unexplained reference numeral 6b indicates a perforated bundle pipe configured to guide water to the dewatering water tank 6a.

<Water Return and Circulation Pipe 10>

The water return and circulation pipe 10 guides the underground water in the geothermal hole 1 to the water collection and supply well 20. An inlet formed at one side of the water return and circulation pipe is configured to correspond to the interior of the geothermal hole 1, and an outlet formed at the other side of the water return and circulation pipe is connected to the water collection and supply well 20.

Opening, closing, and the opening degree of the water return and circulation pipe 10 are controlled by a valve 11. The valve 11 is used to adjust pressure in the geothermal hole 1.

The water return and circulation pipe 10 does not extend to the bottom of the geothermal hole 1, and the inlet of the water return and circulation pipe may be inserted inwards from the upper part of the geothermal hole 1. At this time, the outlet of the water return and circulation pipe is located so as not to be higher than the inlet of the water return and circulation pipe such that underground water is naturally collected in the water collection and supply well 20.

Alternatively, the water return and circulation pipe 10 may be connected to the supply pipe 40 (via a U band at the bottom of the geothermal hole 1) so as to extend over the geothermal hole 1. At this time, it is preferable for a plurality of holes, through which underground water flows in, to be formed in multiple stages in order to return underground water.

Of course, the water return and circulation pipe 10 is not limited thereto, and any structure or system capable of supplying underground water in the geothermal hole 1 to the water collection and supply well 20 may also be used.

The water return and circulation pipe 10 is generally a pipe having a diameter of about 100 mm. In the case in which the number of the geothermal holes 1 is small, the geothermal holes 1 are independently connected to the water collection and supply well 20 via the water return and circulation pipe. In the case in which a plurality of geothermal holes 1 is provided or in the case in which a plurality of geothermal holes 1 is disposed at irregular positions, the portion of the water return and circulation pipe closer to the water collection and supply well 20 is configured to have a larger diameter such that underground water flows from the geothermal holes 1 to the water collection and supply well 20 without hindrance (see FIG. 10). That is, in the latter case, water return and circulation pipes 10 having different diameters are provided, and the diameter of the water return and circulation pipe 10 is gradually increased from the water return and circulation pipe distant from the water collection and supply well 20 to the water return and circulation pipe close to the water collection and supply well 20.

The water return and circulation pipe 10 is configured such that a sufficient head is maintained in the water collection and supply well 20 in order to prevent hindrance when underground water flows into the water collection and supply well 20.

Water pressure is not greatly generated in the water return and circulation pipe 10, whereas discharge pressure or external load is applied to the water return and circulation pipe from the outside, whereby the water return and circulation pipe may be compressed. Consequently, a dual pipe or a PVC pipe having a structure capable of withstanding the above pressure or load may be used as the water return and circulation pipe, or a concrete pipe may also be used.

Meanwhile, in the case in which it is necessary to form the water return and circulation pipe 10 at a great depth, the underground portion may be horizontally excavated toward the geothermal hole 1 through the water collection and supply well 20 using an excavator 100 to form a water return well and the water return and circulation pipe 10 may be installed in the water return well, without excavation of the ground, as shown in FIG. 12.

<Water Collection and Supply Well 20 (Water Supply, Collection, and Supply Well)>

The water collection and supply well 20 collects underground water in order to provide heat of the underground water to the heat pump 30 as a heat source, and may be formed in any structure (a circular or quadrangular structure) having an underground water collection space and may be made of any material (concrete or FRP).

It is preferable for the water collection and supply well 20 to be disposed at a lower height (on the ground or underground) than the inlet of the water return and circulation pipe 10 such that underground water in the geothermal hole 1 flows into the water collection and supply well 20 via the water return and circulation pipe 10. Of course, the above disposition is not necessary in the case in which a separate lift pump is used.

In order to circulate underground water collected in the water collection and supply well 20, a circulation pump 21 and a pipe 22 for supply are provided in addition to the water collection and supply well 20.

The circulation pump 21 is installed inside or outside the water collection and supply well 20.

A general underwater circulation pump may be used as an internal circulation pump 21, which is a circulation pump installed in the water collection and supply well 20, and a plurality of circulation pumps, including a spare circulation pump, may be provided.

An external circulation pump 21 is installed in the pipe 22 formed outside the water collection and supply well 20. At this time, what is commonly called a booster pump may be installed such that pump step control is possible depending on the flow rate of circulating underground water, and an inverter function may be added thereto such that flow rate control is possible.

A protective cover is installed at the upper part of the water collection and supply well 20. In the case in which an underwater motor pump is installed, an automatic detachment device and a lifting rail are provided in consideration of convenience in maintenance.

Also, in order to remove foreign matter from underground water discharged from the water collection and supply well 20, a filtration tank 23 may be connected to an inlet of the circulation pump 21. The filtration tank 23 may have any of various structures, such as a tank structure.

In addition, a pollution source that pollutes water or foreign matter may be included in the underground water collected in the water collection and supply well 20, and a water purifier 60 (see FIG. 8) may be provided in order to prevent water pollution due to the pollution source and the foreign matter and to prevent clogging of a circulation system. The water purifier 60 is connected to the water collection and supply well 20 via a pipe such that the water purifier receives the underground water collected in the water collection and supply well 20 to remove foreign matter therefrom and supplies the purified water to the water collection and supply well 20 through the pump 61.

The water purifier 60 is not limited thereto. The water purifier may be connected in series between the water return and circulation pipe 10 and the water collection and supply well 20 or may be installed at a discharge side of the water collection and supply well 20.

In the case in which a single geothermal hole 1 is installed and thus an underwater motor pump for underground water is installed, the water collection and supply well 20 may be configured to have a diameter of about 200 mm. In the case in which a plurality of geothermal holes 1 is provided, however, a large water collection and supply well configured to have a diameter of 1000 mm or more may be provided, or a large waterproof concrete structure may be provided, whereby it is possible to provide the function of a buffer or the function of a service tank such that lowering of water level or overflow of water does not occur due to time difference in a process in which a large amount of circulating underground water that flows into the water collection and supply well from the geothermal hole(s) 1 via the water return and circulation pipe 10 is collected and pumped.

For example, as shown in FIG. 11, a water level sensor 24 configured to sense the level of underground water collected in the water collection and supply well 20 and a drainage means configured to drain the underground water in the water collection and supply well 20 to the outside may be provided.

The drainage means includes a drainage pump 25 and a drainage pipe.

A value sensed by the water level sensor 24 is transmitted to the controller. The controller compares a current value sensed by the water level sensor 24 with a reference value. Upon determining that underground water is stored to a predetermined level or higher, the controller performs control such that the drainage pump 25 is operated to drain the underground water in the water collection and supply well 20. The drainage pump 25 discharges the underground water in the water collection and supply well 20 to the geothermal hole 1 or a separate storage tank.

In addition, a water quality sensor configured to measure water quality of the underground water collected in the water collection and supply well 20 may also be provided in the water collection and supply well 20. A water quality value sensed by the water quality sensor may be output through a monitor. Also, in the case in which pollution is determined to be a reference value or more, an alarm may be output through a program of the controller.

An overflow plate is installed in the water collection and supply well 20 such that underground water that flows into the water collection and supply well via the water return and circulation pipe 10 primarily connected thereto is collected inside the overflow plate and sand or slime sunken due to gravity is filtered as the result of an increase in water level, whereby only clean underground water flows to a water supply side of the water collection and supply well.

In addition, an auxiliary heat source, such as a boiler or a heating wire, may be installed at the water collection and supply well 20 in order to replenish a shortage of geothermal heat in a severe winter.

In addition, a water supply pump configured to supply water for cultivation to a flower growing farm may be connected to the water collection and supply well 20. Furthermore, a spray nozzle is installed in a polytunnel such that the temperature in the house is not lowered by water curtain. Only underground water is used in the state in which the heat pump 30 is not operated. That is, water curtain cultivation is performed using underground water collected in the water collection and supply well 20 while having higher temperature than atmospheric temperature.

In the case in which the water return and circulation pipe 10 is introduced from outside a building, a separate water return manifold 47 and a separate water supply manifold 46 may be provided outside the building, and a sleeve 48 may be installed in a wall of the building such that the water return and circulation pipe is introduced as a single pipe and is then connected to the water collection and supply well 20 and the supply pipe 40, as shown in FIG. 13.

<Heat Pump 30>

The heat pump 30, which is an ordinary product, supplies heat for cooling and heating to a load using heat of the underground water supplied from the water collection and supply well 20 as a heat source. For example, the heat pump cools and heats a polytunnel using a load-side heat exchanger 31.

Sand or foreign matter is hardly contained in the underground water supplied to the heat pump 30 from the water collection and supply well 20, and therefore it is possible to omit installation of a plate heat exchanger, whereby it is possible to configure economic facilities. The heat pump 30 includes a heat exchanger configured to exchange heat with underground water. In the case in which a separate heat exchanger 32 is provided, therefore, it should be understood that the heat pump includes the separate heat exchanger.

In order to prevent scale from being formed on the heat exchanger 32 and the pipe of the heat pump 30 due to calcium and magnesium in underground water as the result of omission of the plate heat exchanger, an anti-scaling device 33 (a so-called scale booster) may be installed in the pipe, as shown in FIG. 16.

<Supply Pipe 40>

The supply pipe 40 extends from the heat pump 30 to the geothermal hole 1 in order to supply underground water that has exchanged heat with a thermal medium of the heat pump 30 to the geothermal hole 1.

The supply pipe 40 may include a ground-side supply portion 41 connected to a discharge side of the heat pump 30, a geothermal-hole-side supply portion 42 connected to the ground-side supply portion 41, the geothermal-hole-side supply portion being configured to guide the flow of underground water in a direction from a ground-surface-side of the geothermal hole 1 to the bottom of the hole, and a water return portion 43 configured to guide the flow of underground water in a direction from the bottom of the hole to the ground-surface-side of the hole, wherein the geothermal-hole-side supply portion and the water return portion form a U shape. Each of the ground-side supply portion 41 and the geothermal-hole-side supply portion 42 is a non-perforated pipe, and the water return portion 43 returns the underground water that has passed through the geothermal-hole-side supply portion 42 to the geothermal hole 1 through multi-stage water return holes. Of course, the water return portion 43 may be omitted and only the supply portion 42 may be formed in the geothermal hole 1.

Each of the ground-side supply portion 41, the geothermal-hole-side supply portion 42, and the water return portion 43 is a pipe-shaped portion. The geothermal-hole-side supply portion 42 and the water return portion 43 may be connected to each other via a pipe-shaped U band at the bottom of the hole. Alternatively, the geothermal-hole-side supply portion and the water return portion may be connected to each other via a barrel type water return header 44, as shown in FIG. 5.

The water return header 44 has a barrel type structure or a U-shaped structure having a larger inner capacity than the geothermal-hole-side supply portion 42 and the water return portion 43. The geothermal-hole-side supply portion 42 and the water return portion 43 are connected to each other via the water return header. Sand or slime included during a process of returning underground water is received (accumulated) in the water return header, whereby it is possible to prevent clogging of an underground water flow system.

The supply pipe 40 is provided with a valve 45 configured to control opening, closing, and the opening degree thereof. Preferably, the valve 45 is installed at the ground-side supply portion 41.

In the case in which two or more supply pipes 40 are used, the water supply manifold 46 is applied such that a single pipe extending through the heat pump 30 is connected to the two or more supply pipes 40.

Alternatively, as shown in FIG. 4, the supply pipe 40 may have a single structure configured to guide the flow of underground water in a direction from the ground surface side to the bottom of the hole (in this case, a discharge end thereof is disposed at the bottom of the hole).

<Socket Type Connection Structure>

It is preferable for the following connection structure to be provided depending on the structure of the water return and circulation pipe 10 and the structure of the supply pipe 40.

As shown in FIGS. 5 and 14, a connection socket 70 includes a housing 71 open at upper and lower sides thereof, a pipe-shaped connection portion 72 formed on the circumference of the housing 71 so as to protrude, the water return and circulation pipe 10 being joined to the connection portion, and a connection pipe 73 installed in the housing 71, the ground-side supply portion 41 and the geothermal-hole-side supply portion 42 being joined to the connection pipe.

For example, the lower part of the connection socket 70 is connected to the grouting casing 3, and the upper part of the connection socket is connected to the upper protective hole 4. To this end, a flange is provided at each of the upper part and the lower part of the housing 71.

The connection portion 72 laterally protrudes from the circumference of the housing 71, and the water return and circulation pipe 10 is directly or indirectly connected to the connection portion.

The connection pipe 73 includes first and second connection portions 73a and 73b, to which the ground-side supply portion 41 and the geothermal-hole-side supply portion 42 are connected, respectively.

Based on disposition of the ground-side supply portion 41 and the geothermal-hole-side supply portion 42, the first connection portion 73a extends in a horizontal direction, and the second connection portion 73b extends downwards from the first connection portion 73a in a vertical direction.

The first connection portion 73a of the connection pipe 73 may be fixed to the housing 71 by welding in the state in which the first connection portion extends through the housing. Additionally, a support member may be provided.

<Cleaning of Geothermal Hole, etc.>

Sand or slime accumulated in the geothermal hole 1 may be discharged above the surface of the ground in order to clean the geothermal hole. For example, compressed air is injected into the supply pipe 40 such that the compressed air is discharged above the surface of the ground. During this process, sand or slime in the geothermal hole 1 (including sand or slime in the supply pipe 40) is discharged above the surface of the ground.

As shown in FIG. 15, a connection port 74 is formed at the connection pipe so as to extend upwards. At the time of cleaning, the connection port 74 is opened and is connected to an air compressor 200 on the ground via a hose, the ground-side supply portion 41 and the water return and circulation pipe 10 are closed by the values (or check valves are used), and high-pressure compressed air is injected.

For example, the connection port 74 is formed in the upper part of the connection pipe of the connection socket 70 shown in FIG. 14 in a pipe shape, and an opening of the connection port is closed by a cap 75.

FIG. 17 is a view showing an example in which two or more heat pumps 30 (in the figure, two heat pumps are shown) are connected to a single water collection and supply well 20. A distribution header 26 is connected to a single pump 21, and the two heat pumps 30 are connected to the distribution header 26 so as to perform heat exchange.

FIG. 18 shows that underground water collected in two or more water collection and supply wells 20 is gathered and supplied to a single heat pump 30, in contrast to FIG. 17 (installation of a water collection and supply well for each zone).

Specifically, in the case in which required geothermal capacity is large, the water collection and supply wells 20 may be installed and operated so as to be assigned to partitioned zones. A water collection and supply well 20 is installed so as to be assigned to a plurality of geothermal holes, a suction pipe of a pump 21 extends from the water collection and supply well 20 to a machinery compartment, or a plurality of water collection and supply wells 20 is connected to a single main header 27 via pipes and is then connected to the pump 21. At this time, a connection pipe may be connected to the main header using a head of the pipe extending from the water collection and supply well 20 in an inclined state, or a suction pipe may be provided between the main header 27 and the pump 21. In addition, it is necessary to increase the size of the water return pipe in order to reduce friction loss resistance.

In addition, as shown in FIG. 19, a plurality of water collection and supply wells 20 assigned to partitioned zones may also be connected to a single main water collection and supply well 20-1. At this time, a separate supply pump configured to move underground water may be provided between the water collection and supply wells 20 assigned to partitioned zones and the main water collection and supply well 20-1. Of course, in the case in which a slope configured to guide the flow of underground water is provided between the water collection and supply wells 20 assigned to partitioned zones and the main water collection and supply well 20-1, the supply pump is omitted.

<In Case in which Geothermal Hole is Artesian Well that is Constructed in Basement of Building and has a Low Natural Water Level>

In the case in which the geothermal hole 1 is excavated in the basement of a building and the water collection and supply well 20 is installed in the basement of the building in the same manner, as shown in FIG. 20, underground water overflows from the geothermal hole 1 in the form of an artesian well due to confined underground water at a place at which a natural water level is low, and the underground water flows into the water collection and supply well 20 via the water return and circulation pipe 10, whereby the underground water also overflows from the water collection and supply well. As a result, there occurs a problem in that the underground water must be continuously pumped outside so as to be drained in order to prevent submersion of the building.

In order to prevent this, the water collection and supply well 20 is configured to have a hermetically sealed structure in which leakage of underground water due to water pressure therein does not occur (for example, installation of a hermetically sealed upper protective hole). In this case, the water collection and supply well 20 does not need replenishment water necessary to maintain the water level therein while underground water is returned by the pump 21, and a small space for the water collection and supply well is allowed, whereby it is possible to easily manufacture and install a water collection and supply well having a hermetically sealed structure that exhibits watertightness. At this time, it is necessary to install air vents 40*a* and 22*a* in the pipes, such as the supply pipe 40 and the pipe 22, such that the interiors of all of the circulation pipes are full of underground water.

Also, in the case in which the geothermal hole 1 is formed in the basement of the building and thus a bedrock is directly connected thereto, whereby the hermetically sealed upper protective hole 4 is installed at the upper part of the geothermal hole 1 in the state in which there is no grouting casing for pollution prevention, the upper protective hole 4 is configured to have a structure in which the lower part thereof is directly inserted into the geothermal hole 1 and a structure for coupling with the supply pipe 40.

<Method of Excavating and Constructing Geothermal Hole in Basement of Building before Open Cut>

As shown in FIG. 21, the geothermal hole 1 is excavated in a building site before open cut, and the geothermal-hole-side supply portion 42 and the water return portion 43 of the supply pipe 40 are installed in the geothermal hole 1. At this time, the final depth of the basement of the building is checked, and a straight pipe 49 having a shielding device 49*a* installed higher by 0.5 to 1 mm than the final depth of the basement is installed at the upper part of the geothermal-hole-side supply portion 42 in the geothermal hole 1, and then the upper part of the shielding device 49*a* is shielded using a grouting material, such as bentonite and cement. The straight pipe 49 is marked with a scale for length measurement such that the installation depth of the shielding device 49*a* can be accurately measured. A material that does not exhibit high solidity after curing is used as the grouting material. In addition, a colored grouting material is supplied such that a worker who performs open cut recognizes the location of the shielding device 49*a* and thus the location of the geothermal hole 1 based on the color of the grouting material during engineering work, such as open cut. Of course, a method of disposing a colored cylindrical body 80 around the shielding device 49*a* may also be used.

The shielding device 49*a* is installed in a structure in which a rod configured to be inserted into the geothermal-hole-side supply portion 42 is formed at the lower part of the shielding device, the upper part of the geothermal hole 1 is blocked using a sponge, and a shielding agent provided at the outer circumference of a central body portion of the shielding device expands to shield a space between the wall of the geothermal hole 1 and the central body portion.

<Circulation of Underground Water Using Water Supply Geothermal Hole>

The geothermal hole 1 described above is configured to supply underground water to the water collection and supply well 20 via the water return and circulation pipe 10.

In the present invention, it is also possible to use a water supply geothermal hole instead of the water collection and supply well 20.

As shown in FIG. 22, a water supply geothermal hole 1-1 is constructed in the vicinity of geothermal holes 1 so as to supply underground water. An underwater pump P configured to supply underground water to a heat pump 30 (for heat exchange) is installed in the water supply geothermal hole 1-1, and the water supply geothermal hole is connected to the geothermal holes 1 via water return and circulation pipes 10 in order to receive underground water from the geothermal holes 1.

Meanwhile, an underground water hole 50 for replenishment water is also used in order to supply a sufficient amount of underground water to operate the pump P to the water supply geothermal hole 1-1. A pump for the underground water hole 50 for replenishment water is operated based on the level of the underground water in the water supply geothermal hole 1-1 (a water level value sensed by a water level sensor 24) such that underground water for replenishment water is supplied to the water supply geothermal hole 1-1.

Each geothermal hole 1 and the water supply geothermal hole 1-1 are filled with a filler, such as bean gravel, in order to prevent collapse and to improve thermal conductivity. Here, the water supply geothermal hole 1-1 is filled with the filler up to the height of the pump P.

For economic construction, each geothermal hole 1 and the underground water hole 50 for replenishment water are configured to have a diameter of 150 mm, and the water supply geothermal hole 1-1 is configured to have a diameter of 200 mm, since the pump P and a supply pipe 40 are installed in the water supply geothermal hole.

Underground water that has passed through the heat pump 30 is supplied to the geothermal holes 1 and the water supply geothermal hole 1-1 via the supply pipe 40. Meanwhile, in the case in which an underground water aquifer is not developed in both the geothermal holes 1 and the water supply geothermal hole 1-1, whereby it is difficult to supply underground water through the water supply geothermal hole 1-1, the water level in the water supply geothermal hole 1-1 may be abruptly reduced until the underground water is circulated through the heat pump 30 and is then supplied to the geothermal holes 1 and the water supply geothermal hole 1-1, whereby the amount of underground water that is supplied to the geothermal holes 1 is reduced, and therefore normal operation of the geothermal system may not be possible. An example in which underground water pumped from the underground water hole 50 for replenishment water is not supplied to the water collection and supply well 20 but is directly supplied to the geothermal holes 1 in order to prevent this situation is shown in FIG. 23.

At this time, underground water for replenishment water may be supplied as the result of joining with underground water that returns to the geothermal holes 1 (for example, joining with the geothermal-hole-side supply portion 42 in a Y shape). At this time, the underground water hole 50 for replenishment water includes branch pipes such that the underground water can be used as cultivation water or tap water, and an electric-powered valve configured to be electronically driven is installed to selectively use tap water and geothermal replenishment water. A three-way valve may be used as the valve. Of course, as shown in FIG. 24, an underground deep water well pump 80 may be installed in the geothermal hole 1 such that underground water can be used as cultivation water or tap water.

FIG. 24 shows a water supply facility configured to supply tap water using a geothermal hole 1 and a water supply geothermal hole 1-1. This water supply facility is useful in a small-scale geothermal system for a small smart farm, a house, or a villa complex. The water supply facility includes a water supply pump 80 configured to supply underground water in the geothermal hole 1 as plant cultivation water or tap water and a water supply pipe 81 and a faucet 82 connected to the water supply pump 80.

In order to prevent damage to a supply pipe 40 or a water return and circulation pipe 10 due to vibration generated during operation of a pump P installed in the water supply geothermal hole 1-1 and operation of the water supply pump 80 installed in the geothermal hole 1, a separate inner casing 83 is inserted into the geothermal hole 1 such that the pump P or the water supply pump 80 is not brought into direct contact with the supply pipe 40 or the water return and circulation pipe 10.

The lower end of the inner casing 83 is perforated such that underground water can be smoothly pumped.

Of course, the water supply facility configured to supply cultivation water or tap water is not limited to the water supply geothermal hole 1-1, and is equally applicable even when a water collection and supply well 20 is used.

The invention claimed is:

1. A geothermal system comprising:
   two or more geothermal holes formed underground;
   a water return and circulation pipe connected to each of the two or more geothermal holes and configured to supply underground water from each of the two or more geothermal holes;
   a water collection and supply well connected to the water return and circulation pipe and configured to collect the underground water via the water return and circulation pipe connected to each of the two or more geothermal holes and to supply the collected underground water;
   at least one heat pump configured to produce heat for cooling and heating using heat of the underground water supplied from the water collection and supply well as a heat source; and
   a supply pipe configured to supply the underground water that has supplied the heat to the heat pump to each of the two or more geothermal holes,
   wherein the supply pipe comprises:
      a ground-side supply portion configured to guide the underground water that has passed through the at least one heat pump;
      a geothermal-hole-side supply portion connected to the ground-side supply portion, the geothermal-hole-side supply portion being provided in each of the two or more geothermal holes, the geothermal-hole-side supply portion being configured to guide the underground water to a bottom of each of the two or more geothermal holes; and
      a water return portion connected to the geothermal-hole-side supply portion, the water return portion being configured to discharge the underground water into each of the two or more geothermal holes while guiding the underground water upwards.

2. The geothermal system according to claim 1, wherein a water supply geothermal hole formed underground is configured to supply the underground water instead of the water collection and supply well, the water supply geothermal hole being configured to pump the underground water and to supply the pumped underground water together with the underground water returned by the water return and circulation pipe.

3. The geothermal system according to claim 2, further comprising an underground water hole configured to replenish the water collection and supply well or the water supply geothermal hole with water.

4. The geothermal system according to claim 3, wherein the underground water hole is formed underground, the underground water hole configured to pump and supply the underground water.

5. The geothermal system according to claim 2, further comprising:
   a water level sensor configured to sense a water level in the water collection and supply well;
   a drainage configured to discharge the underground water in the water collection and supply well based on a value sensed by the water level sensor; and
   an underground water hole configured to replenish the underground water.

6. The geothermal system according to claim 1, wherein the water return and circulation pipe has an opening formed at one side thereof, the opening being configured to correspond to an interior of each of the two or more geothermal holes so as to supply the underground water from the two or more geothermal holes.

7. The geothermal system according to claim 6, wherein the water return and circulation pipe is configured to have a water flow area gradually increasing toward the water collection and supply well, the water return and circulation pipe extending along the two or more geothermal holes.

8. The geothermal system according to claim 1, wherein the water return and circulation pipe and the water collection and supply well extend through a connection socket, and
   the connection socket comprises:
      a housing open at upper and lower sides thereof;

a connection portion formed on a circumference of the housing so as to protrude, the water collection and supply well being connected to the connection portion; and a connection pipe installed in the housing, the ground-side supply portion and the geothermal-hole-side supply portion being joined to the connection pipe.

9. The geothermal system according to claim 8, wherein the connection pipe comprises: a connection port extending from an upper part of the geothermal-hole-side supply portion; and a cap separably coupled to the connection port.

10. The geothermal system according to claim 1, further comprising:

an inner casing installed in each of the two or more geothermal holes, wherein the supply pipe is disposed in the inner casing, the supply pipe being configured to supply the underground water at the bottom of each of the two or more geothermal holes, and the water return and circulation pipe is configured to return the underground water at a top of each of the two or more geothermal holes.

11. The geothermal system according to claim 1, further comprising a hermetically sealed upper protective hole installed in an upper part of each of the two or more geothermal holes.

12. The geothermal system according to claim 1, wherein the geothermal-hole-side supply portion and the water return portion are connected to each other via a water return header disposed at the bottom of each of the two or more geothermal holes, and the water return header is a barrel having a larger capacity than the geothermal-hole-side supply portion and the water return portion or a U-shaped structure.

13. The geothermal system according to claim 1, further comprising a water supply facility configured to pump the underground water in the two or more geothermal holes and to supply the pumped the underground water as cultivation water or tap water.

14. A method of constructing a geothermal system, the method comprising:

a first step of constructing two or more geothermal holes underground;

a second step of constructing a water collection and supply well on the ground or underground so as to be adjacent to the two or more geothermal holes;

a third step of connecting the two or more geothermal holes and the water collection and supply well to each other via a water return and circulation pipe such that underground water in the two or more geothermal holes is collected in the water collection and supply well;

a fourth step of installing a heat pump and providing a pipe between the heat pump and the water collection and supply well such that the underground water collected in the water collection and supply well is circulated to the heat pump;

a fifth step of installing a supply pipe such that the underground water that has passed through the heat pump is supplied to the two or more geothermal holes, wherein the supply pipe comprises:

a ground-side supply portion configured to guide the underground water that has passed through the at least one heat pump;

a geothermal-hole-side supply portion connected to the ground-side supply portion, the geothermal-hole-side supply portion being provided in each of the two or more geothermal holes, the geothermal-hole-side supply portion being configured to guide the underground water to a bottom of each of the two or more geothermal holes; and a water return portion connected to the geothermal-hole-side supply portion, the water return portion being configured to discharge the underground water into each of the two or more geothermal holes while guiding the underground water upwards.

* * * * *